United States Patent
Yuan

(10) Patent No.: US 11,210,489 B2
(45) Date of Patent: Dec. 28, 2021

(54) METHOD FOR FINGERPRINT RECOGNITION AND RELATED DEVICES

(71) Applicant: GUANGDONG OPPO MOBILE TELECOMMUNICATIONS CORP., LTD., Guangdong (CN)

(72) Inventor: Shilin Yuan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 94 days.

(21) Appl. No.: 16/678,040

(22) Filed: Nov. 8, 2019

(65) Prior Publication Data

US 2020/0151415 A1    May 14, 2020

(30) Foreign Application Priority Data

Nov. 8, 2018  (CN) .......................... 201811325114.8
Sep. 10, 2019 (CN) .......................... 201910854381.2

(51) Int. Cl.
*G06K 9/00*  (2006.01)
*G06F 3/041*  (2006.01)
*G06F 3/044*  (2006.01)

(52) U.S. Cl.
CPC ........... *G06K 9/0002* (2013.01); *G06F 3/044* (2013.01); *G06F 3/04146* (2019.05);
(Continued)

(58) Field of Classification Search
None
See application file for complete search history.

(56) References Cited

U.S. PATENT DOCUMENTS

2002/0018585 A1* 2/2002 Kim ....................... G07C 9/257
                                                                382/125
2018/0165508 A1   6/2018 Othman et al.
2020/0092411 A1* 3/2020 Xu ..................... H04M 1/72436

FOREIGN PATENT DOCUMENTS

CN       105678184       6/2016
CN       105786277       7/2016
(Continued)

OTHER PUBLICATIONS

Feng et al., "Touch Panel with Integrated Fingerprint Sensors Based User Identity Management," IEEE International Conference on Technologies for Homeland Security (HST), Nov. 2013, pp. 154-160.

(Continued)

*Primary Examiner* — Nicholas J Lee
(74) *Attorney, Agent, or Firm* — Hodgson Russ LLP

(57) ABSTRACT

A method for fingerprint recognition is provided. An electronic device includes a touch screen. The touch screen has a fingerprint recognition area. The fingerprint recognition area is capable of being pressed by at least two fingers. The method includes the following. Touched areas in the fingerprint recognition area are selected as target touch areas upon detecting a touch operation on the touch screen. One target touch area corresponds to one finger which applies pressure to the touch screen. A fingerprint image in each target touch area is acquired to obtain at least one fingerprint image. Determine whether each of the at least one fingerprint image is matched with a corresponding fingerprint image template of a preset fingerprint image template set. A preset operation corresponding to the touch operation is triggered, upon determining that each of the at least one fingerprint image is matched with a corresponding fingerprint image template.

16 Claims, 32 Drawing Sheets

(52) U.S. Cl.
CPC .................. *G06K 9/00087* (2013.01); *G06F 2203/04104* (2013.01); *G06F 2203/04105* (2013.01)

(56) References Cited

FOREIGN PATENT DOCUMENTS

| | | |
|---|---|---|
| CN | 105912918 | 8/2016 |
| CN | 106022075 | 10/2016 |
| CN | 106951767 | 7/2017 |
| CN | 107273878 | 10/2017 |
| CN | 107315935 | 11/2017 |
| CN | 107506629 | 12/2017 |
| CN | 107563174 | 1/2018 |
| CN | 107578013 | 1/2018 |
| CN | 108052820 | 5/2018 |
| CN | 108319838 | 7/2018 |
| CN | 109271837 | 1/2019 |

OTHER PUBLICATIONS

EPO, Office Action for EP Application No. 19208037.2, dated Mar. 25, 2020.
WIPO, English translation of the ISR and WO for PCT/CN2019/116764, dated Jan. 31, 2020.
IPI, Office Action for IN Application No. 201914045501, dated Jun. 13, 2021.
CNIPA, First Office Action for CN Application No. 201910854381.2, dated Aug. 4, 2021.

\* cited by examiner

METHOD FOR FINGERPRINT RECOGNITION AND RELATED DEVICES

CROSS-REFERENCE TO RELATED APPLICATIONS

This application claims priority to Chinese Patent Application No. 201910854381.2, filed on Sep. 10, 2019 and Chinese Patent Application No. 201811325114.8, filed on Nov. 8, 2018. The entire disclosures of the aforementioned applications are incorporated herein by reference.

TECHNICAL FIELD

This disclosure relates to the technical field of mobile terminals, and particularly to a method for fingerprint recognition and related devices.

BACKGROUND

With wide popularity of mobile terminals such as smart phones, the smart phone can support an increasing number of applications and are becoming more powerful. The smart phone is also becoming diversified and personalized and has already been an indispensable electronic device in users' life. To improve the user experience of the smart phone in use, a display of the smart phone is getting bigger and a screen-to-body ratio is getting higher. With the emergence of the full-screen display, under-display or in-display fingerprint recognition technology is developed rapidly. However, related fingerprint recognition techniques are only capable of supporting single-point fingerprint recognition.

SUMMARY

Implementations of the present disclosure provide a method and a device for fingerprint recognition, to achieve under-display multi-point fingerprint recognition.

According to a first aspect, implementations of the disclosure provide a method for fingerprint recognition. The method is applicable to an electronic device. The electronic device includes a touch screen. The touch screen has a fingerprint recognition area. The fingerprint recognition area is capable of being pressed by at least two fingers. The method includes the following.

Touched areas in the fingerprint recognition area are selected as target touch areas upon detecting a touch operation on the touch screen. One target touch area corresponds to one finger which applies pressure to the touch screen. A fingerprint image in each target touch area is acquired to obtain at least one fingerprint image. Determine whether each of the at least one fingerprint image is matched with a corresponding fingerprint image template of a preset fingerprint image template set. A preset operation corresponding to the touch operation is triggered, upon determining that each of the at least one fingerprint image is matched with a corresponding fingerprint image template of the preset fingerprint image template set.

According to a second aspect, implementations of the disclosure provide an electronic device. The electronic device includes a touch screen, a fingerprint sensor, a memory, and a processor.

The touch screen has a fingerprint recognition area capable of being pressed by at least two fingers. The fingerprint sensor is disposed in an area corresponding to the fingerprint recognition area and configured to acquire a fingerprint image. The memory is configured to store a preset fingerprint image template set. The preset fingerprint image template set includes at least one fingerprint image template. The processor is configured to: select touched areas in the fingerprint recognition area as target touch areas upon detecting a touch operation on the touch screen, where one target touch area corresponds to one finger which conducts the touch operation, acquire a fingerprint image in each target touch area to obtain at least one fingerprint image, and trigger a preset operation corresponding to the touch operation, upon determining that each of the at least one fingerprint image is matched with a corresponding fingerprint image template of the preset fingerprint image template set.

According to a third aspect, a non-transitory computer readable storage medium is provided. The non-transitory computer readable storage medium is configured to store a computer program which, when executed by a processor, causes the processor to execute the following. Touched areas in the fingerprint recognition area are selected as target touch areas upon detecting a touch operation on the touch screen. One target touch area corresponds to one finger which applies pressure to the touch screen. A fingerprint image in each target touch area is acquired to obtain at least one fingerprint image. A preset operation corresponding to the touch operation is triggered, upon determining that each of the at least one fingerprint image is matched with a corresponding fingerprint image template of the preset fingerprint image template set.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In order for those skilled in the art to better understand technical solutions of the present disclosure, in the following, technical solutions of implementations of the present disclosure will be described clearly and completely with reference to accompanying drawings in implementations of the present disclosure. Apparently, implementations described hereinafter are merely some implementations, rather than all implementations, of the present disclosure. All other implementations obtained by those of ordinary skilled in the art based on implementations of the present disclosure without creative efforts shall fall within the protection scope of the present disclosure.

This application provides an electronic device. The electronic device can include various handheld devices (e.g., laptop computers, netbook computers, tablet computers, web browsers, e-book readers, and personal digital assistants (PDAs)), in-vehicle devices, wearable devices (such as smart watches, smart bracelets, pedometers, or the like), computing devices that have fingerprint recognition and touch functions, or other processing devices connected to the wireless modem, as well as various forms of user equipment (UE), mobile stations (MS), terminal devices, and the like. For the convenience of description, the above-mentioned devices are collectively referred to as the electronic device. Hereinafter, implementations of the disclosure will be described in detail. The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1:
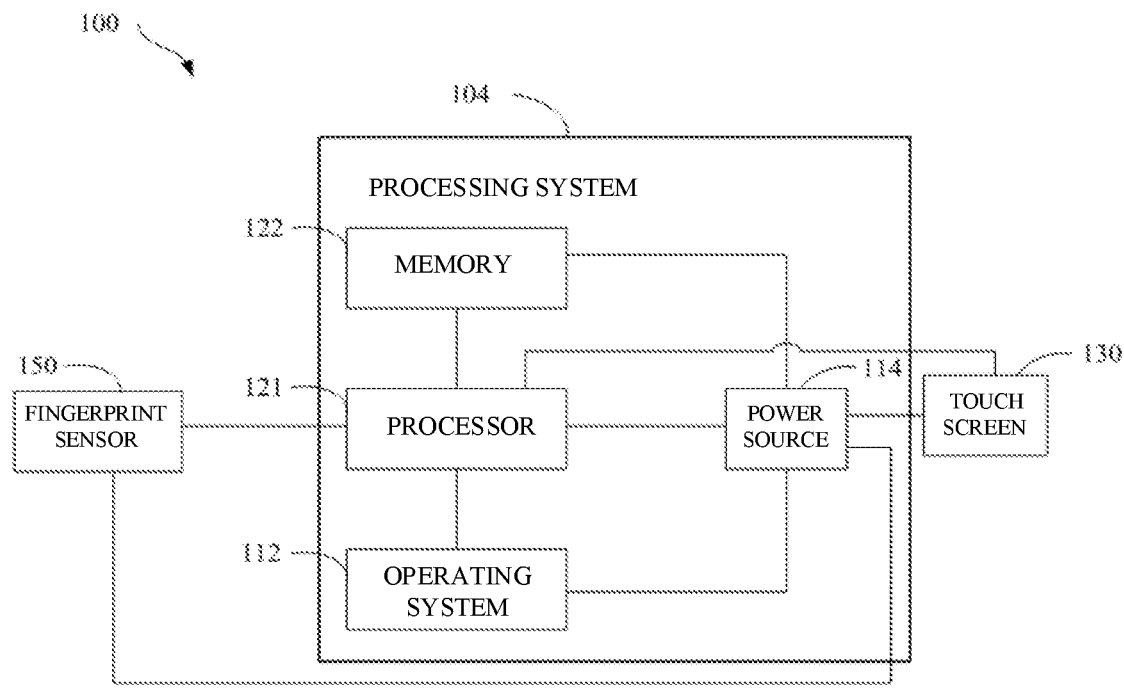
FIG. 1 is a block diagram illustrating a circuit of an electronic device according to implementations.

FIG. 1 is a block diagram illustrating a circuit of an electronic device according to implementations. The electronic device 100 includes a processing system 104, a touch screen 130, and a fingerprint sensor 150. The processing system 104 includes one or more processors 121, a memory 122, an operating system 112, and a power source 114. The terms "include", "comprise", and "have" as well as variations thereof are intended to cover non-exclusive inclusion. For example, other components (devices), a series of steps, methods, systems, and the like can also be included. For example, the processing system 104 can include other components in addition to the one or more processors 121, the memory 122, the operating system 112, and the power source 114 mentioned above.

The one or more processors 121, the memory 122, and the operating system 112 may be directly or indirectly coupled with each other physically, communicatively, and/or operatively. The power source 114 is electrically coupled to the one or more processors 121, the memory 122, and the operating system 112, to provide electrical energy to components connected thereto.

The processor 121 is also referred to as a controller, and the processor 121 is a component of importance in the electronic device 100 for processing instructions, executing operations, controlling timing, processing data, and the like. The function of the processor 121 will be described in detail below, and details are not described herein again.

In an example, the memory 122 includes a temporary memory. The content stored in the temporary memory will not be maintained when the electronic device 100 is turned off. In another example, the memory includes volatile memory and non-volatile memory. The volatile memory includes, but is not limited to, a random access memory (RAM), a dynamic random access memory (DRAM), and a static random access memory (SRAM). The non-volatile memory includes, but is not limited to, a magnetic hard disk, a solid state drive (SSD), an optical disk, a floppy disk, a flash memory, or an erasable programmable read only memory (EPROM) or electrically erasable programmable read-only memory (EEPROM) memory. The program codes stored in the memory 122 are callable and executable by the at least one or more processors 121.

The operating system 112 can control the operation of other components of the processing system 104. For example, the operating system 112 facilitates the interaction between one or more processors 121 and the memory 122.

The power source 114 is configured to provide other components (e.g., the processor 121, the memory 122, the fingerprint sensor 150, etc.) in the electronic device 100 with the electrical energy required for operation. The power source 114 can be, but is not limited to, a one-time power source, or a rechargeable power source. The material of the power source 114 may be, but not limited to, a material such as nickel cadmium, lithium ion or the like.

Figure 2:
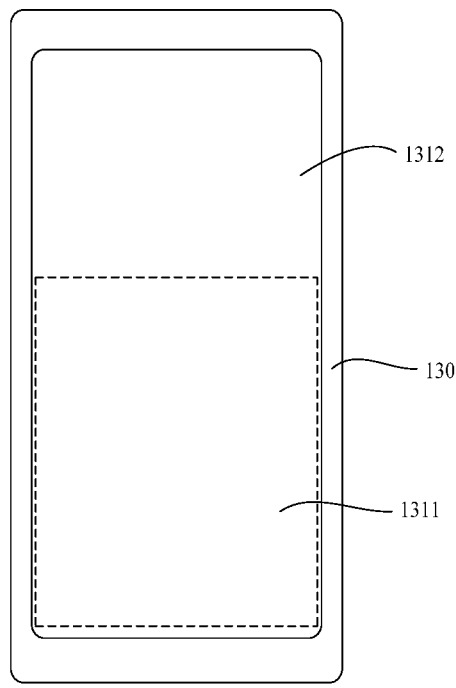
FIG. 2 is a schematic diagram illustrating a fingerprint recognition area of an electronic device according to implementations.
Figure 3:
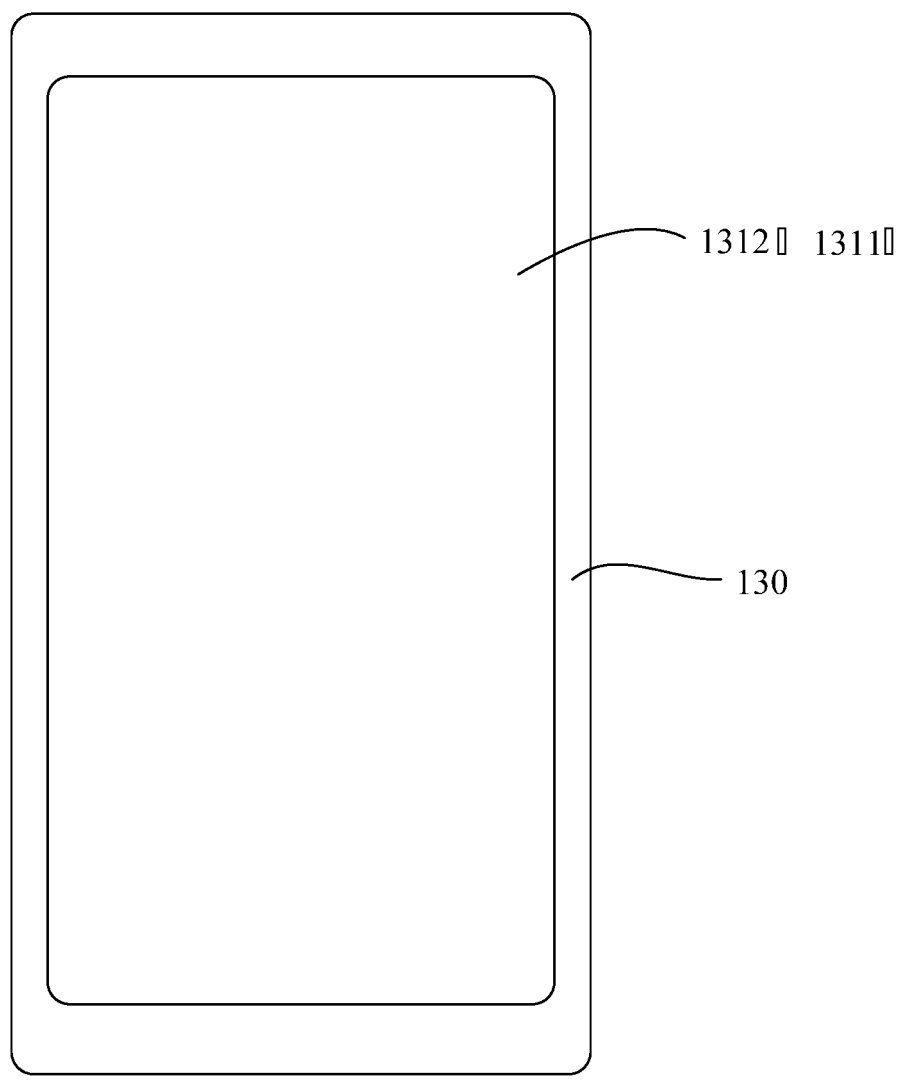
FIG. 3 is a schematic diagram illustrating a fingerprint recognition area of an electronic device according to other implementations.

The touch screen 130 has a fingerprint recognition area 1311, and the fingerprint recognition area 1311 can be simultaneously pressed by at least two fingers, so that the electronic device 100 has a multi-point fingerprint recognition function or has a full-screen fingerprint recognition function. The fingerprint recognition area 1311 can occupy part or all of the touch area 1312 of the touch screen 130. FIG. 2 is a schematic diagram illustrating a fingerprint recognition area of an electronic device according to implementations. In FIG. 2, the fingerprint recognition area 1311 occupies part of the touch area 1312 of the touch screen 130. FIG. 3 is a schematic diagram illustrating a fingerprint recognition area of an electronic device according to other implementations. In FIG. 3, the fingerprint recognition area 1311 occupies all of the touch area 1312 of the touch screen 130.

The fingerprint sensor 150 is disposed in an area corresponding to the fingerprint recognition area 1311 and is configured to acquire a fingerprint image. The fingerprint sensor 150 includes a capacitive fingerprint sensor, an optical fingerprint sensor, and an ultrasonic fingerprint sensor.

Figure 4:
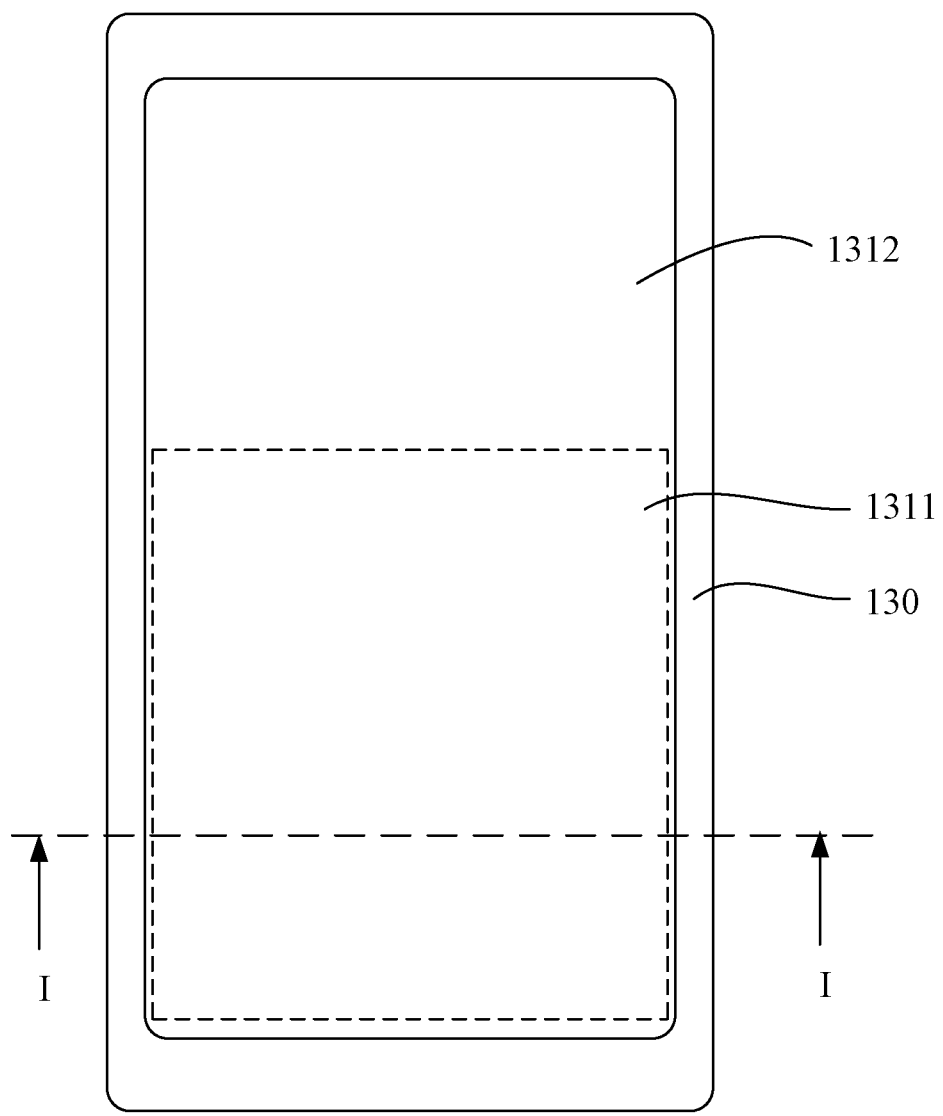
FIG. 4 is a schematic structural diagram illustrating an electronic device according to a first implementation.
Figure 5:
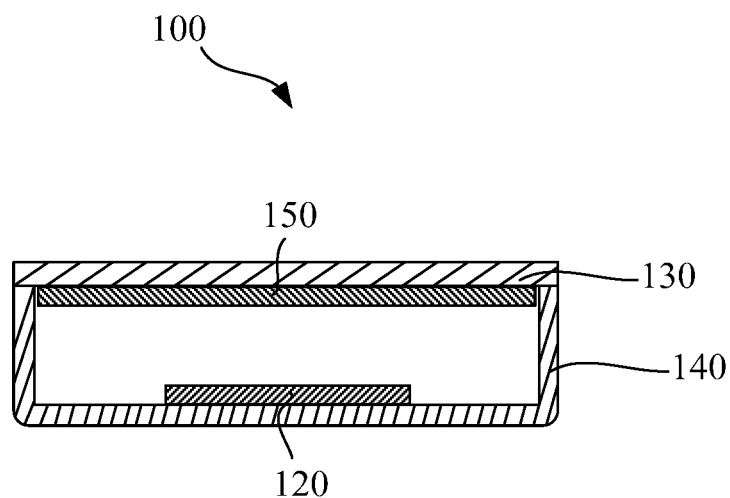
FIG. 5 is a schematic cross-sectional structural view taken along line I-I of FIG. 4.
Figure 6:
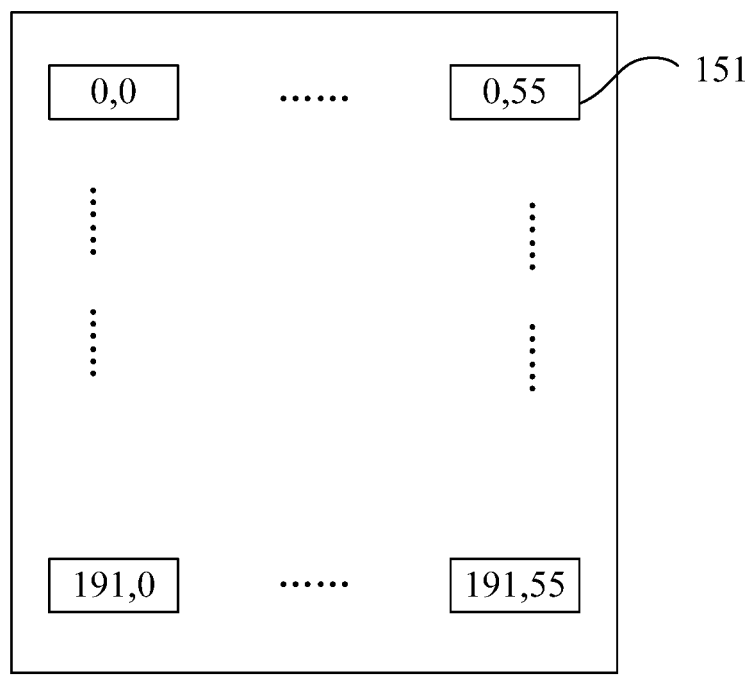
FIG. 6 is a schematic structural diagram of a fingerprint sensor in an electronic device according to the first implementation.

In the case where the fingerprint sensor 150 includes a capacitive fingerprint sensor, the working principle of the fingerprint sensor 150 is described below. FIG. 4 is a schematic structural diagram illustrating an electronic device according to a first implementation. FIG. 5 is a schematic cross-sectional structural view taken along line I-I of FIG. 4. FIG. 6 is a schematic structural diagram of a fingerprint sensor in an electronic device according to the first implementation. The electronic device 100 includes a touch screen 130. The touch screen 130 has a fingerprint recognition area 1311. The fingerprint sensor 150 is disposed in an area corresponding to the fingerprint recognition area 1311. Other components of the electronic device 100 that are not relevant to the present application are not illustrated. The fingerprint sensor 150 includes multiple sensing units 151 distributed in array. In the schematic diagram, a case where the fingerprint sensor 150 includes 56*192=10752 sensing units 151 is illustrated as an example. In this case, a reference numeral of each of the sensing units 151 represents a row and a column of the sensing unit 151. For example, (0, 0) indicates 1th row and 1th column, (0, 55) indicates 1th row and 56th column, (191, 0) indicates 192th row and the 1st column, and (191, 55) indicates the 192th row and 56th column. When a finger of a user is placed on the touch screen 130, each sensing unit 151 forms a capacitance with the surface of the finger. A fingerprint of the finger includes ridges and valleys, distances between the ridges in the fingerprint of the finger and the sensing units 151 are relatively close, and distances between the valleys in the fingerprint of the finger and the sensing units 151 are relatively far. Therefore, according to a position of each sensing unit 151 in the fingerprint sensor 150 and magnitude of a capacitance of each sensing unit 151, a rugged three-dimensional surface can be obtained, through which a fingerprint image of the user can be simulated.

Furthermore, the electronic device 100 further includes a housing 140 and a circuit board 120. The housing 140 has a receiving space. The touch screen 130 is disposed at an opening of the receiving space. The circuit board 120 is provided with a processor 121 and a memory 122. The circuit board 120 is disposed in the receiving space. The functions of the processor 121 and the memory 122 are described below.

In an example, the fingerprint sensor 150 is independent of the touch screen 130. It can be understood that, in other examples, the fingerprint sensor 150 can be integrated inside the touch screen 130.

Figure 7:
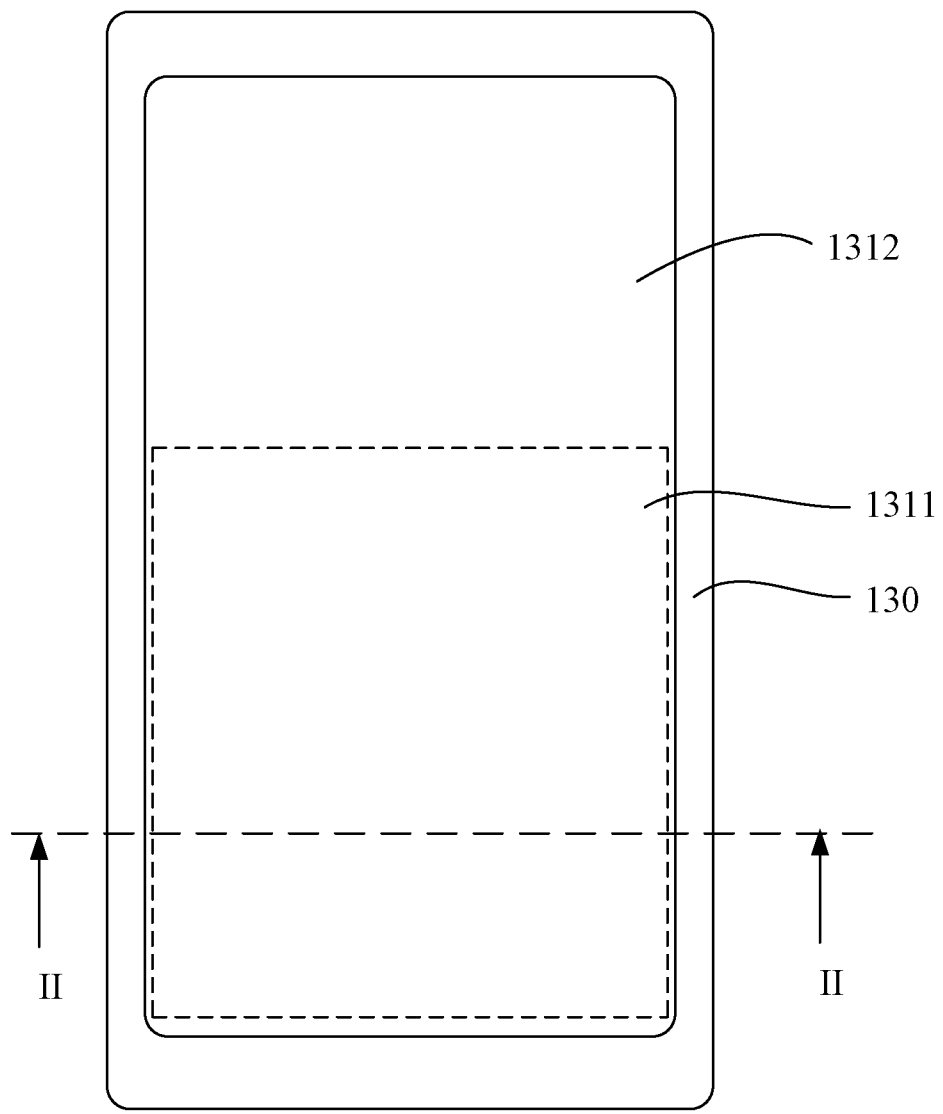
FIG. 7 is a schematic structural diagram illustrating an electronic device according to a second implementation.
Figure 8:
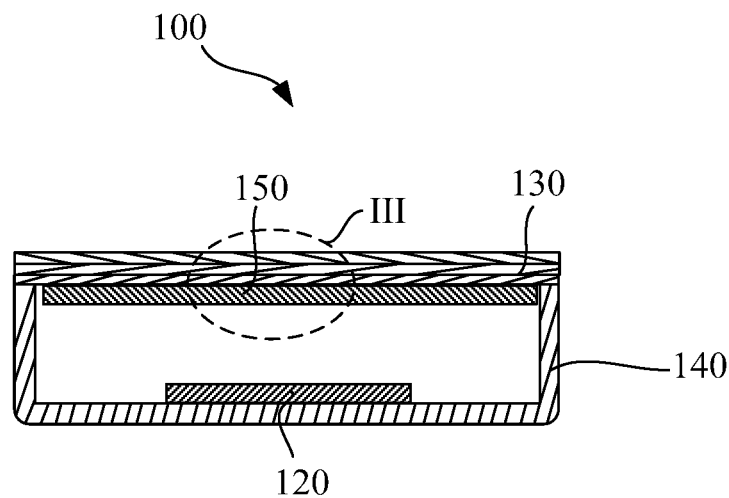
FIG. 8 is a schematic cross-sectional structural view taken along line II-II of FIG. 7.
Figure 9:
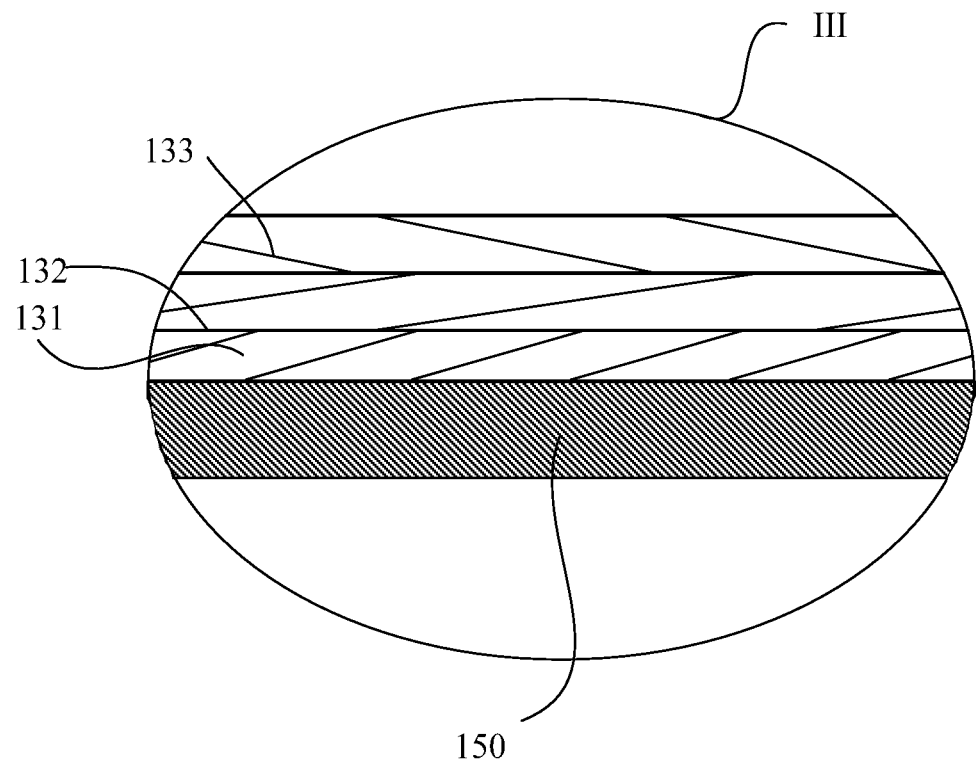
FIG. 9 is a schematic view of the structure at III in FIG. 8.
Figure 10:
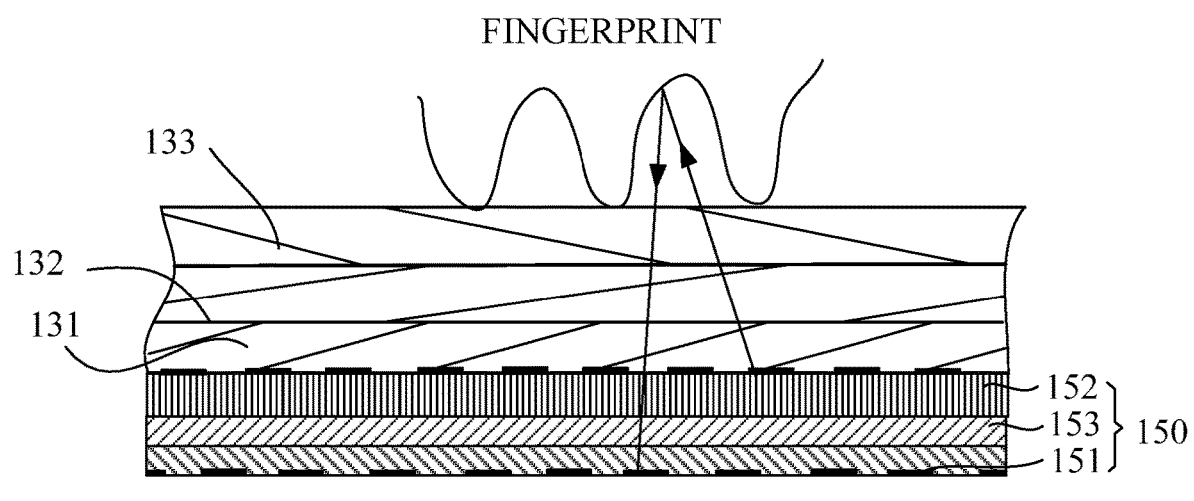
FIG. 10 is a schematic structural diagram of a fingerprint sensor in an electronic device according to the second implementation.

In the case where the fingerprint sensor 150 includes an optical fingerprint sensor, the working principle of the fingerprint sensor 150 is described below. FIG. 7 is a schematic structural diagram illustrating an electronic device according to a second implementation. FIG. 8 is a schematic cross-sectional structural view taken along line II-II of FIG. 7. FIG. 9 is a schematic view of the structure at III in FIG. 8. FIG. 10 is a schematic structural diagram of a fingerprint sensor in an electronic device according to the second implementation. The touch screen 130 has a fingerprint recognition area 1311, and the fingerprint recognition area 1311 can be pressed by at least two fingers, so that the electronic device 100 has a multi-point fingerprint recognition function or has a full-screen fingerprint recognition function. The fingerprint recognition area 1311 can occupy part or all of the touch area 1312 of the touch screen 130. The fingerprint sensor 150 includes multiple sensing units 151 distributed in array.

Furthermore, the electronic device 100 also has a display function. In one example, the touch screen 130 is an organic light emitting diode (OLED) display screen, and the touch screen 130 includes an OLED display layer 131, a touch layer 132, and a cover plate 133 which are sequentially stacked. In the above example, the fingerprint sensor 150 is located on a side of the OLED display layer 131 away from the touch layer 132. In other examples, the sensing units 151 in the fingerprint sensor 150 may also be disposed in the same layer as a layer structure in the OLED display layer 131 to improve the integration degree of the electronic device 100. The specific layer structure in the OLED display layer 131 will be described in detail below.

Figure 11:
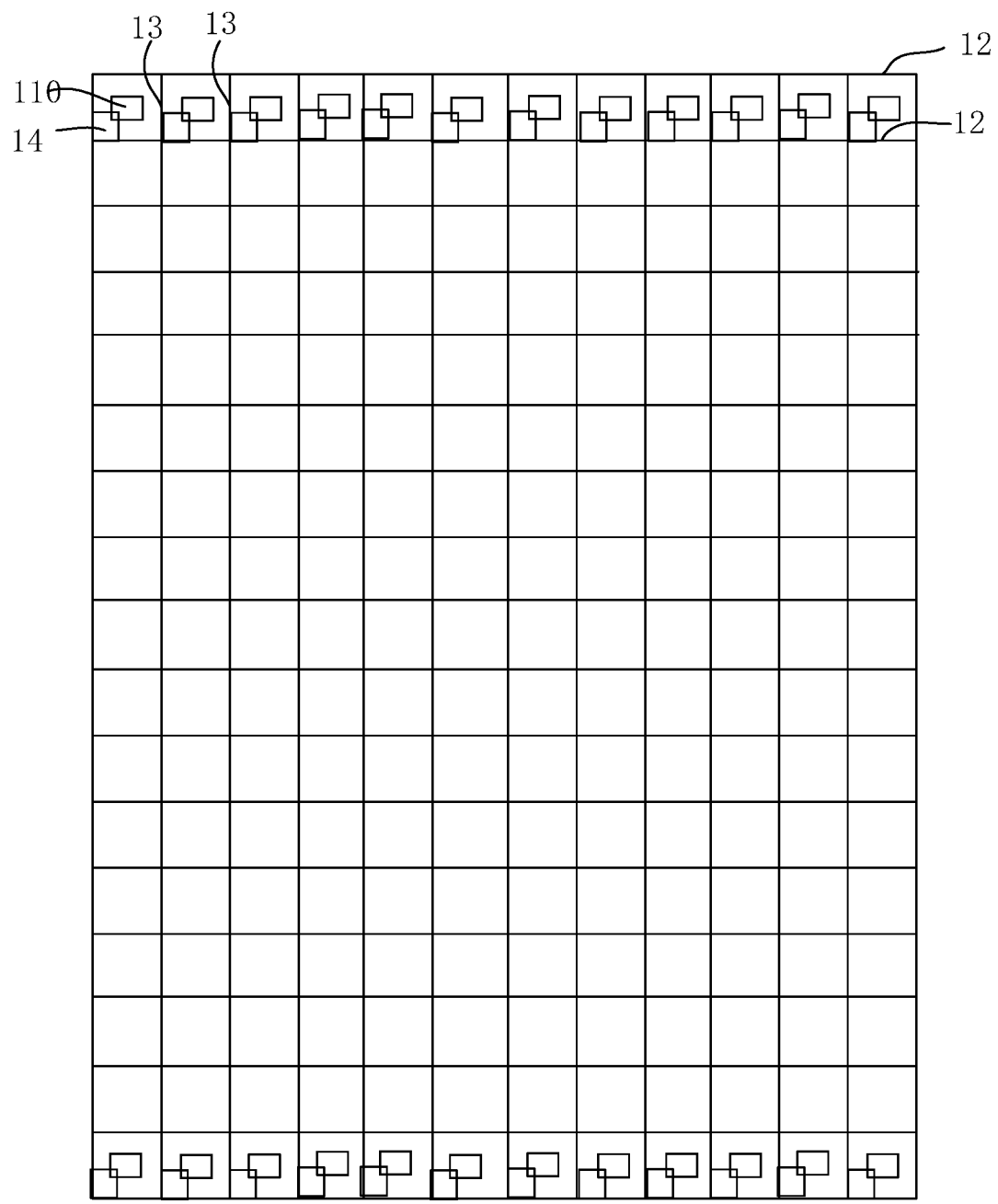
FIG. 11 is a schematic structural diagram of an organic light emitting diode (OLED) display layer in a touch panel according to implementations.
Figure 12:
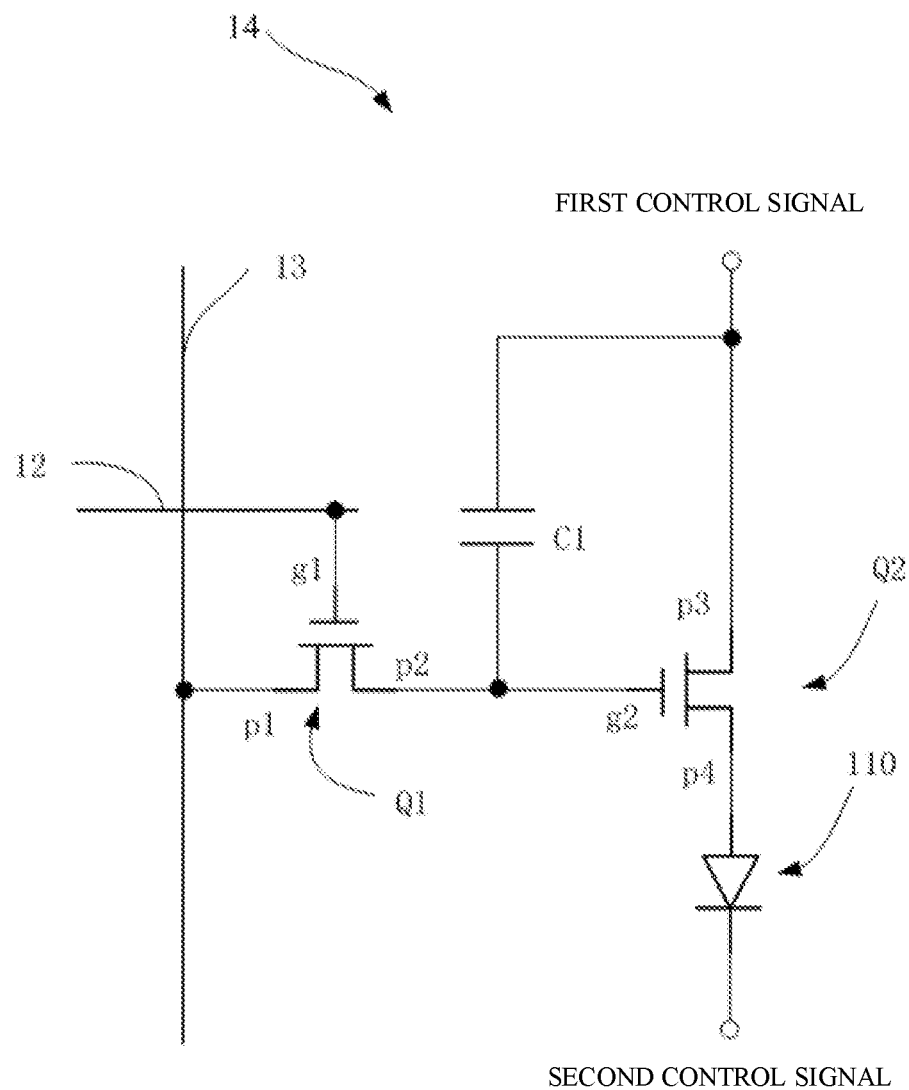
FIG. 12 is a schematic diagram of a circuit architecture of a driving circuit for driving a light emitting unit in an OLED display layer according to implementations.

The following describes the structure of the touch screen 130. FIG. 11 is a schematic structural diagram of an OLED display layer in a touch panel according to implementations. FIG. 12 is a schematic diagram of a circuit architecture of a driving circuit for driving a light emitting unit in an OLED display layer according to implementations. The OLED display layer 131 includes scan lines 12, data lines 13, driving circuits 14, and light emitting units 110. In an example, the scan lines 12 are spaced apart, the data lines 13 are spaced apart, and the data lines 13 are cross-insulated with the scan lines 12. The scan line 12 is configured to transmit a scan signal, and the data line 13 is configured to transmit a data signal. Two adjacent data lines 13 and two adjacent scan lines 12 define a sub-pixel area. The sub-pixel area is configured to set the light emitting unit 110 and the driving circuit 14. The driving circuit 14 is configured to drive the light emitting unit 110 to emit light. There is a gap between adjacent light emitting units 110. The sensing unit 151 is disposed in an area corresponding to a gap between adjacent light emitting units 110. When the fingerprint is collected, the light emitting unit 110 emits light, the light emitted by the light emitting unit 110 is irradiated onto the finger of the user via the gap, and the light irradiated onto the finger of the user is reflected and received by the sensing unit 151. This example only illustrates the driving circuit 14 and the light emitting unit 110 of the first and last rows.

The structure of the driving circuit 14 and the light emitting unit 110 is described in detail below. In an example, the driving circuit 14 includes a first thin film transistor Q1 and a second thin film transistor Q2. When the first thin film transistor Q1 is turned on under control of a scan signal, and the second thin film transistor Q2 is turned on under control of a data signal, a first control signal is applied to an anode of the light emitting unit 110, and a cathode of the light emitting unit 110 is configured to receive a second control signal. In this example, the first control signal is applied to the anode of the light emitting unit 110, and the second control signal is applied to the cathode of the light emitting unit 110. In this case, the first control signal is at a high level, and the second control signal is at a low level. It can be understood that, in other examples, the first control signal is loaded to the cathode of the light emitting unit 110, and the second control signal is loaded to the anode of the light emitting unit 110. In this case, the first control signal is at a low level, and the second control signal is at a high level. The terms "first", "second", and the like in the specification and claims of the present application and the above drawings are used to distinguish different objects, and are not intended to describe a specific order.

Furthermore, the sub-pixel area is further provided with a first capacitor C1. The first thin film transistor Q1, the second thin film transistor Q2, and the first capacitor C1 constitute the driving circuit that drives the light emitting unit. The first thin film transistor Q1 includes a first gate g1, a first end p1, and a second end p2. The second thin film transistor Q2 includes a second gate g2, a third end p3, and a fourth end p4. The first gate g1 is electrically connected to the scan line 12 to receive the scan signal. The first end p1 is electrically connected to the data line 13 to receive the data signal. The second end p2 is electrically connected to the second gate g2. The third end p3 is configured to receive the first control signal. The fourth end p4 is electrically connected to the anode of the light emitting unit 110. The first capacitor C1 has one end electrically connected to the second gate g2. The first capacitor C1 has the other end electrically connected to the third end p3. The first end p1 is a source and the second end p2 is a drain, or the first end p1 is a drain and the second end p2 is a source. The third end p3 is a source and the fourth end p4 is a drain, or the third end p3 is a drain and the fourth end p4 is a source.

In this example, the driving circuit 14 includes the first thin film transistor Q1, the second thin film transistor Q2, and the first capacitor C1. The first thin film transistor Q1 can be an N-type thin film transistor or a P-type thin film transistor. Correspondingly, the second thin film transistor Q2 can be an N-type thin film transistor or a P-type thin film transistor. In this example, the first thin film transistor Q1 and the second thin film transistor Q2 are both N-type thin film transistors. When a gate of the N-type thin film transistor receives a high level signal, a source and a drain of the N-type thin film transistor are turned on. When the gate of the N-type thin film transistor receives a low level signal, the source and the drain of the N-type thin film transistor are turned off. When a gate of the P-type thin film transistor receives a low level signal, a source and a drain of the P-type thin film transistor are turned on. When the gate of the P-type thin film transistor receives a high level signal, the source and the drain of the P-type thin film transistor are turned off. It can be understood that the above is an example structure of the driving circuit 14 for driving the light emitting unit 110. In other examples, the driving circuit 14 can have other structures.

Figure 13:
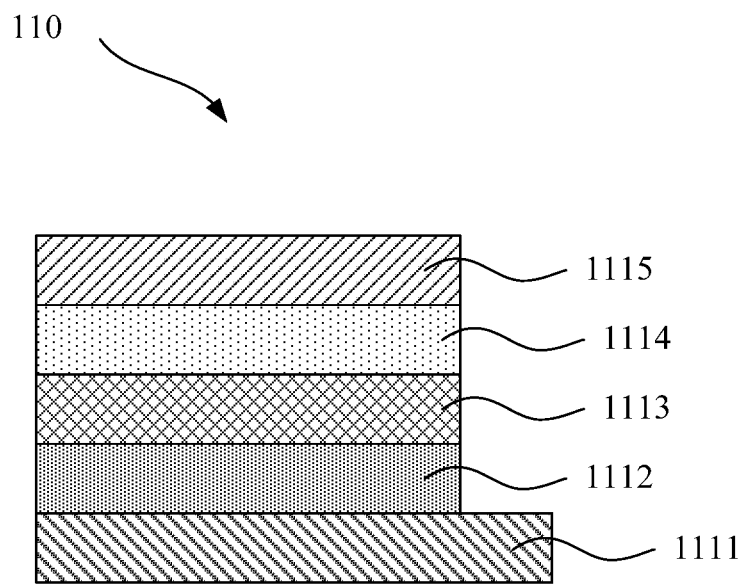
FIG. 13 is a schematic structural view of a light emitting unit.

FIG. 13 is a schematic structural view of a light emitting unit. The light emitting unit 110 further includes an anode 1111, a hole injecting and transporting layer 1112, a light emitting material layer 1113, an electron injecting and transporting layer 1114, and a cathode 1115 which are stacked. The anode 1111 is electrically connected to the fourth end p4 of the second thin film transistor Q2, and receives the first control signal when the third end p3 and the fourth end p4 are turned on. The anode 1111 generates holes under control of the first control signal. The second control signal is applied to the cathode 1115. The cathode 1115 provides electrons under control of the second control signal. The holes generated by the anode 1111 are transferred into the light emitting material layer 1113 via the hole injecting and transporting layer 1112. The electrons generated by the cathode 1115 are transferred into the light emitting material layer 1113 via the electron injecting and transporting layer 1114. The holes and the electrons are combined in the light emitting material layer 1113 to emit light. Generally, the first control signal is at a high level and the second control signal is at a low level.

Figure 14:
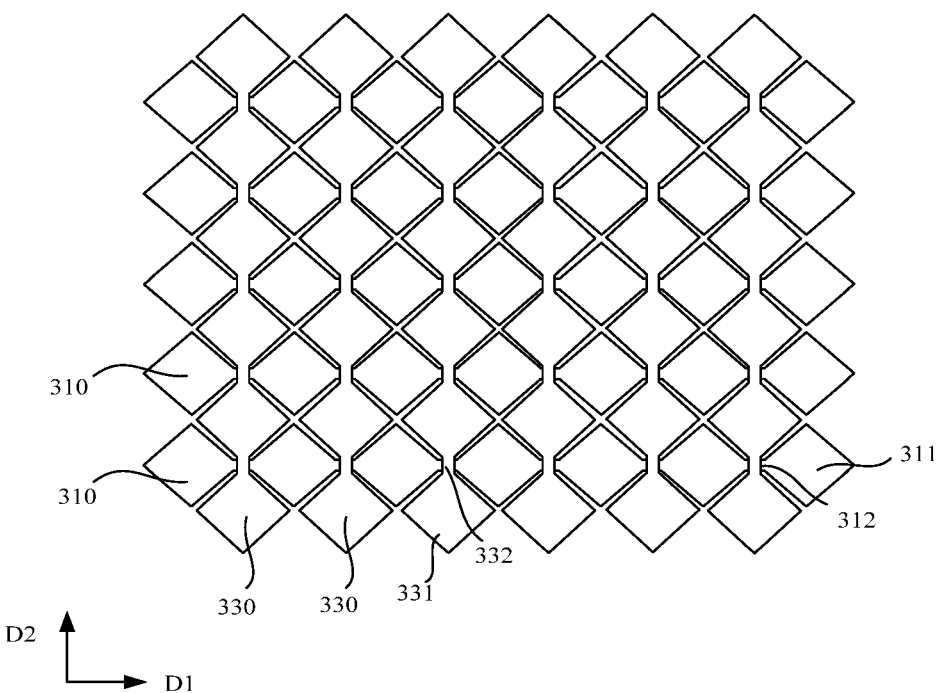
FIG. 14 is a schematic structural view of a touch layer.

FIG. 14 is a schematic structural view of a touch layer. The touch layer 132 includes multiple first electrode chains 310 and multiple second electrode chains 330. The multiple first electrode chains 310 are spaced apart, and each first electrode chain 310 includes electrically connected multiple first electrodes 311. The multiple second electrode chains 330 are spaced apart. The multiple second electrode chains 330 are cross-insulated with the multiple first electrode chains 310. Each second electrode chain 330 includes electrically connected multiple second electrodes 331. The first electrodes 311 and the second electrodes 331 interact to detect a touch operation of the user and a position of the touch operation.

The first electrode chains 310 extend along a first direction D1 and are arranged at intervals along a second direction D2. The second electrode chains 330 extend along the second direction D2 and are spaced apart along the first direction D1. In an example, the first direction D1 is an X direction, and the second direction D2 is a Y direction.

Alternatively, in another example, the first direction D1 is the Y direction, and the second direction D2 is the X direction.

The cover plate 133 is disposed on a side of the touch layer 132 away from the OLED display layer 131. A surface of the cover plate 133 away from the OLED display layer 131 constitutes an outer surface of the electronic device 100 and is configured to receive user operations. It can be understood that in other examples, the touch layer 132 can have other structures.

Furthermore, referring to FIG. 10, the fingerprint sensor 150 includes multiple sensing units 151 distributed in array. The fingerprint sensor 150 further includes a collimating mirror 152. The collimating mirror 152 is disposed between the sensing units 151 and the touch screen 130. The collimating mirror 152 is configured to allow light perpendicular to a light incident surface of the collimating mirror 152 and light that offsets from the light perpendicular to the light incident surface by a preset angle range to pass through. The preset angle range may be, but is not limited to, 5°. The collimating mirror 152 can make the light that offsets from the light perpendicular to the light incident surface by the preset angle range pass through. Therefore, the collimating mirror 152 can expand a concentrating range, so that clarity of the fingerprint image collected can be improved since more light can enter the sensing units 151. Generally, the collimating mirror 152 has a thickness of 0.3 to 0.5 mm and a diameter of 15 to 30 mm.

Furthermore, the fingerprint sensor 150 further includes an infrared film 153. The infrared film 153 is disposed between the collimating mirror 152 and the sensing units 151. The infrared film 153 is configured to shield infrared waves to reduce interference of the infrared waves and improve accuracy of fingerprint recognition. Specifically, the infrared film 153 shields infrared waves and transmits visible light to improve the accuracy of the fingerprint recognition of the electronic device 100 in an environment where infrared waves are present (such as outdoors).

The following describes the process of fingerprint collection in detail. When the touch screen 130 is touched by the finger of the user, the light emitting units 110 emit light, and the light emitted by the light emitting units 110 is illuminated on the surface of the finger of the user and is reflected back to the sensing units 151. There are ridges and valleys in the fingerprint of the finger of the user, and the ridges and the valleys of the fingerprint of the user have different reflection intensity to the light. Therefore, strengths of the signals sensed by the sensing units 151 are different. According to the signals sensed by the sensing units 151, the fingerprint image of the user can be simulated. Generally, since there is sweat, grease, and the like in the valleys of the fingerprint of the user, the light irradiated into the valleys of the fingerprint is absorbed. As such, light reflected from the valleys of the finger of the user is weaker than light reflected from the ridges of the finger of the user. Therefore, according to the position of each sensing unit 151 in the fingerprint sensor 150 and the intensity of the light sensed by each sensing unit 151, the fingerprint image of the user can be simulated.

Furthermore, the fingerprint sensor 150 includes sensing units 151 distributed in array. The sensing units 151 are disposed on a surface of a color film substrate 136 away from a thin film transistor array substrate 134. Furthermore, the sensing units 151 are disposed in an area corresponding to a black matrix 1361 in the color film substrate 136 to ensure that the touch screen 130 has a high light transmittance. The sensing units 151 are disposed in the area corresponding to the black matrix 1361 in the color film substrate 136 as follows. The orthographic projection of the sensing units 151 at the color film substrate 136 at least partially falls within a range of the orthographic projection of the black matrix 1361 at the color film substrate 136.

Furthermore, the fingerprint sensor 150 further includes a collimating mirror 152. The collimating mirror 152 is disposed between the sensing units 151 and the cover plate 133. The collimating mirror 152 is configured to expand a concentrating range so that more light can enter the sensing units 151 to improve definition of the fingerprint image collected.

Furthermore, the fingerprint sensor 150 further includes an infrared film 153. The infrared film 153 is disposed between the collimating mirror 152 and the sensing units 151. The infrared film 153 is configured to shield infrared waves to reduce interference of infrared waves and improve accuracy of fingerprint recognition.

The following describes the process of fingerprint collection in detail. When the touch screen 130 is touched by the finger of the user, pixel electrodes on the thin film transistor array substrate 134 and common electrodes on the color film substrate 136 cooperate to control deflection of liquid crystal molecules in the liquid crystal layer 135. The liquid crystal molecules emit light through a backlight module of the electronic device 100, to illuminate on the surface of the finger of the user, and then the light is reflected back to the sensing units 151. There are ridges and valleys in the fingerprint of the finger of the user, and the ridges and the valleys of the fingerprint of the user have different reflection intensity to the light. Therefore, strengths of the signals sensed by the sensing units 151 are different. According to the signals sensed by the sensing units 151, the fingerprint image of the user can be simulated. Generally, since there is sweat, grease, and the like in the valleys of the fingerprint of the user, the light irradiated into the valleys of the fingerprint is absorbed. As such, light reflected from the valleys of the finger of the user is weaker than light reflected from the ridges of the finger of the user. Therefore, according to the position of each sensing unit 151 in the fingerprint sensor 150 and the intensity of the light sensed by each sensing unit 151, the fingerprint image of the user can be obtained.

Figure 15:
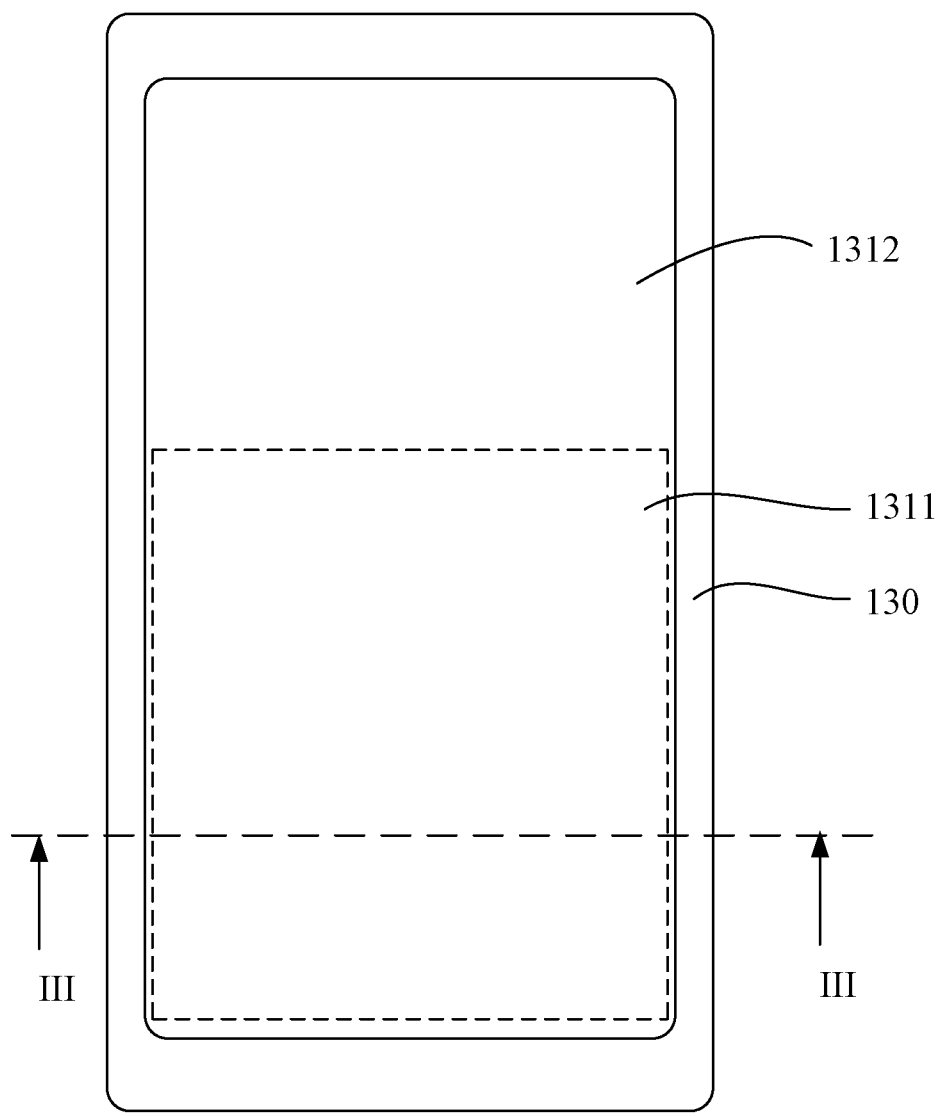
FIG. 15 is a schematic structural diagram of an electronic device according to a third implementation.
Figure 16:
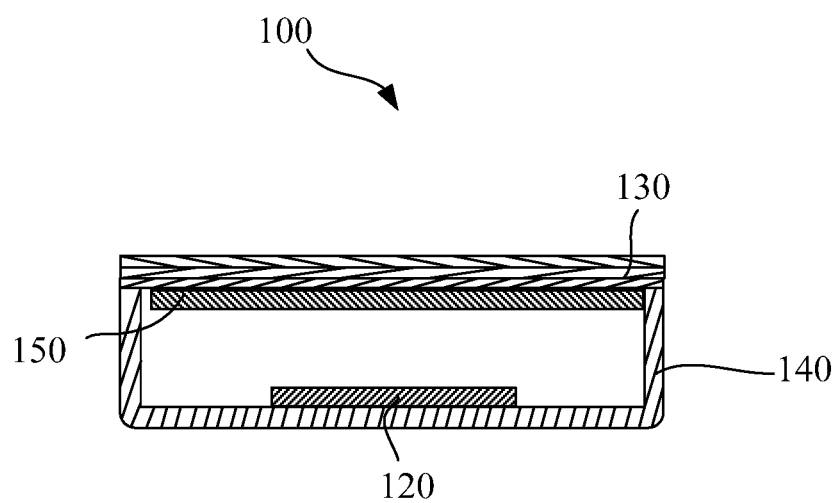
FIG. 16 is a schematic structural view taken along line IV-IV of FIG. 15.
Figure 17:
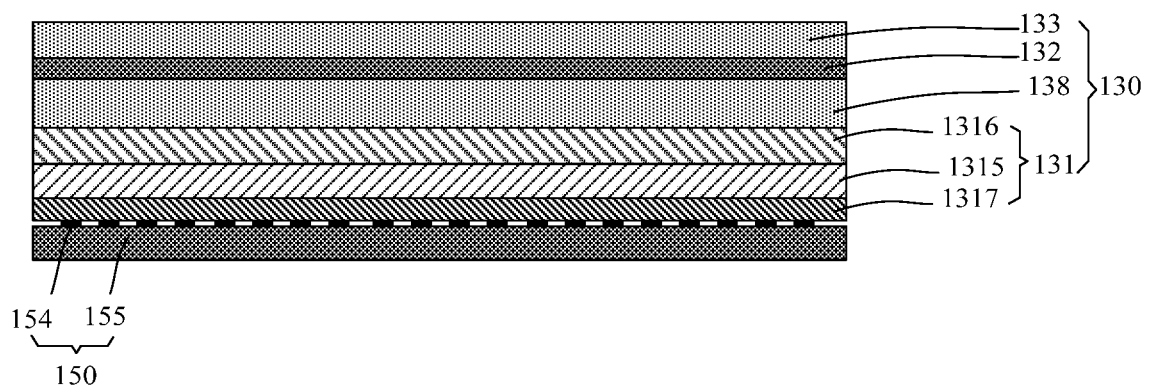
FIG. 17 is a schematic structural view of the touch screen and the fingerprint sensor of FIG. 16.

In the case where the fingerprint sensor 150 includes a ultrasonic fingerprint sensor, the working principle of the fingerprint sensor 150 is described below. FIG. 15 is a schematic structural diagram of an electronic device according to a third implementation. FIG. 16 is a schematic structural view taken along line IV-IV of FIG. 15. FIG. 17 is a schematic structural view of the touch screen and the fingerprint sensor of FIG. 16. The electronic device 100 includes a touch screen 130 and a fingerprint sensor 150. The touch screen 130 includes an OLED display layer 131, a touch layer 132, a cover plate 133, and an encapsulation layer 138. The encapsulation layer 138 is configured to encapsulate the OLED display layer 131. The cover plate 133 is stacked and spaced apart from the encapsulation layer 138. The touch layer 132 is disposed on a side of the cover plate 133 close to the encapsulation layer 138. The OLED display layer 131 includes a substrate 1315, a light emitting layer 1316, and a wiring layer 1317. The light emitting layer 1316 is disposed on the substrate 1315. The wiring layer 1317 is disposed on a side of the substrate 1315 away from the light emitting layer 1316. The fingerprint sensor 150 includes multiple receiving portions 154. The multiple receiving portions 154 are disposed alternately on a side of the substrate 1315 away from the light emitting layer 1316. In this example, the multiple receiving portions 154 are disposed away from the substrate 1315 compared to the wiring layer 1317. A transmitting portion 155 is disposed on a side of the receiving portions 154 away from the substrate 1315. In a possible example, the transmitting portion 155 is made of a piezoelectric material. When the transmitting portion 155 receives a control signal transmitted from the wiring layer 1317, the transmitting portion 155 generates a piezoelectric effect and emits ultrasonic waves.

The following describes the process of fingerprint collection in detail. When the touch screen 130 receives a touch operation from the finger of the user, the processor 121 of the electronic device 100 generates a control signal according to the touch operation. The control signal is transmitted to the transmitting portion 155 via the wiring layer 1317. The transmitting portion 155 generates ultrasonic waves according to the control signal. The ultrasonic waves are transmitted to the surface of the finger of the user and are reflected back to the receiving portions 154. Due to the presence of ridges and valleys in the fingerprint of the finger of the user and height differences between the ridges and the valleys, the ridges and the valleys of the finger of the user have different reflection intensity to the ultrasonic wave. Generally, since distances from the transmitting portion 155 to the ridges of the fingerprint are shorter than distances from the transmitting portion 155 to the valleys of the fingerprint, for the ultrasonic wave of the same intensity, the ultrasonic wave reflected from the valley of the fingerprint is weaker than the ultrasonic wave reflected from the ridge of the fingerprint. Thus, the fingerprint image of the user can be simulated based on the position of each of the receiving portions 154 in the fingerprint sensor 150 and the intensity of the ultrasonic wave sensed by each of receiving portions 154. Furthermore, the electronic device 100 also has a display function. In an example, the touch screen 130 is a liquid crystal display (LCD).

Figure 18:
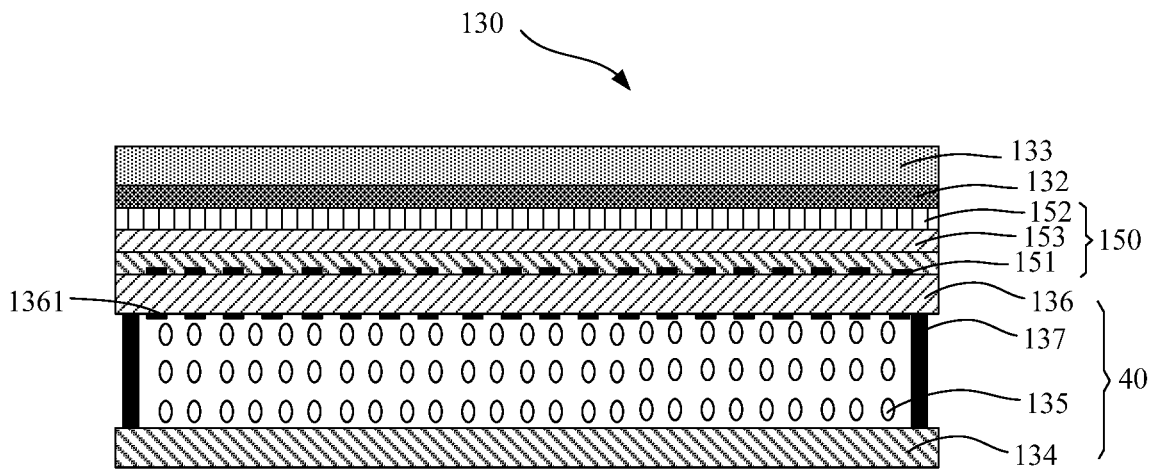
FIG. 18 is a schematic structural diagram of a touch screen according to implementations.

FIG. 18 is a schematic structural diagram of a touch screen according to implementations. In the case that the touch screen 130 is a liquid crystal display, the touch screen 130 includes a thin film transistor array substrate 134, a liquid crystal layer 135, a color film substrate 136, a touch layer 132, and a cover plate 133. The thin film transistor array substrate 134 is disposed opposite to and spaced apart from the color film substrate 136. The liquid crystal layer 135 is disposed between the thin film transistor array substrate 134 and the color film substrate 136. The touch screen 130 further includes a sealing frame 137 between the thin film transistor array substrate 134 and the color film substrate 136. The sealing frame 137 is configured to form a seal for the liquid crystal layer 135. The thin film transistor array substrate 134, the liquid crystal layer 135, the color film substrate 136, and the sealing frame 137 constitute a display screen 40. The thin film transistor array substrate 134 is provided with thin film transistors distributed in array and pixel electrodes electrically connected to the thin film transistors. The color film substrate 136 is provided with common electrodes. The common electrodes cooperate with the pixel electrodes to control deflection of liquid crystal molecules in the liquid crystal layer 135. The thin film transistor array substrate 134, the liquid crystal layer 135, and the color film substrate 136 realize the display function of the electronic device 100. The cover plate 133 is disposed on a side of the color film substrate 136 away from the thin film transistor array substrate 134. A surface of the cover plate 133 away from the color film substrate 136 constitutes the design surface of the electronic device 100 and is configured to receive user operations. In this example, the touch layer 132 is disposed on a surface of the cover plate 133 close to the color film substrate 136. The touch layer 132 implements a touch function of the electronic device 100. In other examples, the touch layer 132 can also be disposed on the thin film transistor array substrate 134 or the color film substrate 136.

Although various forms of the touch screen 130 and the fingerprint sensor 150 are described above, the present disclosure is not limited to any specific form, as long as the touch screen 130 can have the fingerprint recognition area 1311 and the fingerprint recognition area 1311 can be simultaneously pressed by at least two fingers.

Figure 19:
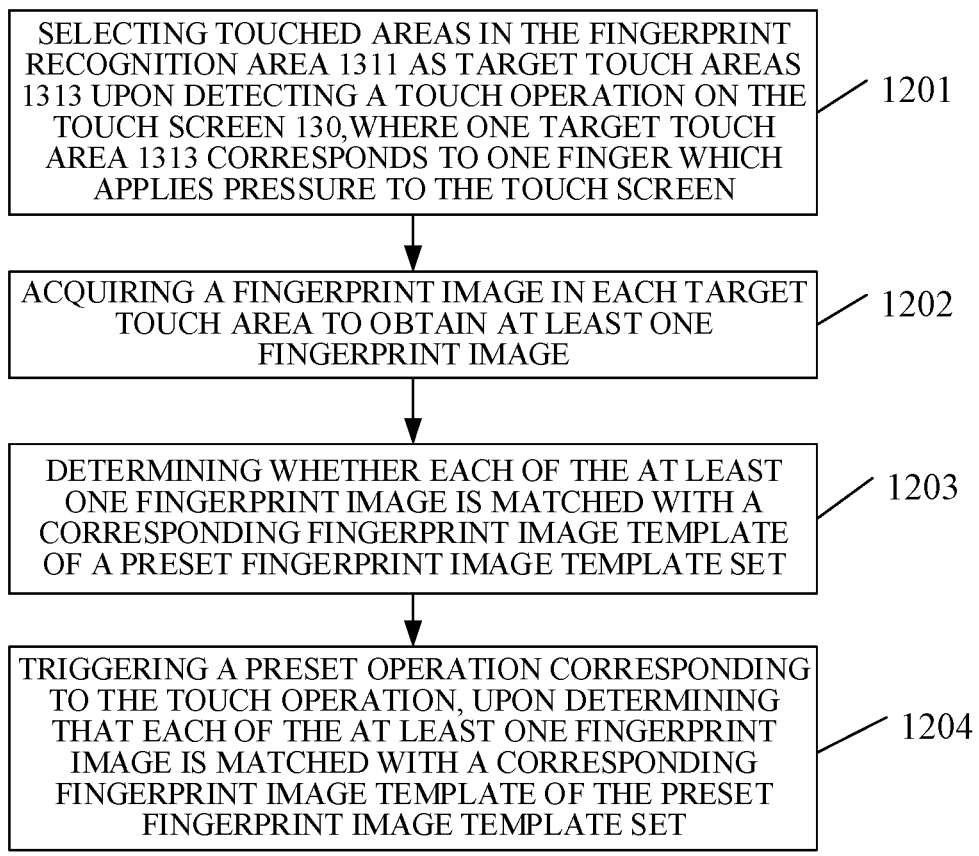
FIG. 19 is a schematic flow chart of a method for fingerprint recognition according to the first implementation.

The method for fingerprint recognition of the present application will be described below in conjunction with the electronic device 100 introduced in the foregoing examples. FIG. 19 is a schematic flow chart of a method for fingerprint recognition according to the first implementation. The method is applicable to an electronic device 100. The electronic device 100 includes a touch screen 130 and a fingerprint sensor 150. The touch screen 130 has a fingerprint recognition area 1311. The fingerprint sensor 150 is disposed in an area corresponding to the fingerprint recognition area 1311. The fingerprint recognition area 1311 can be pressed by at least two fingers at the same time. The method includes 1201, 1202, 1203, and 1204, which are described in detail below.

At 1201, touched areas in the fingerprint recognition area 1311 are selected as target touch areas 1313 upon detecting a touch operation on the touch screen 130. One target touch area 1313 corresponds to one finger which applies pressure to the touch screen.

At 1202, a fingerprint image in each target touch area is acquired to obtain at least one fingerprint image.

Figure 20:
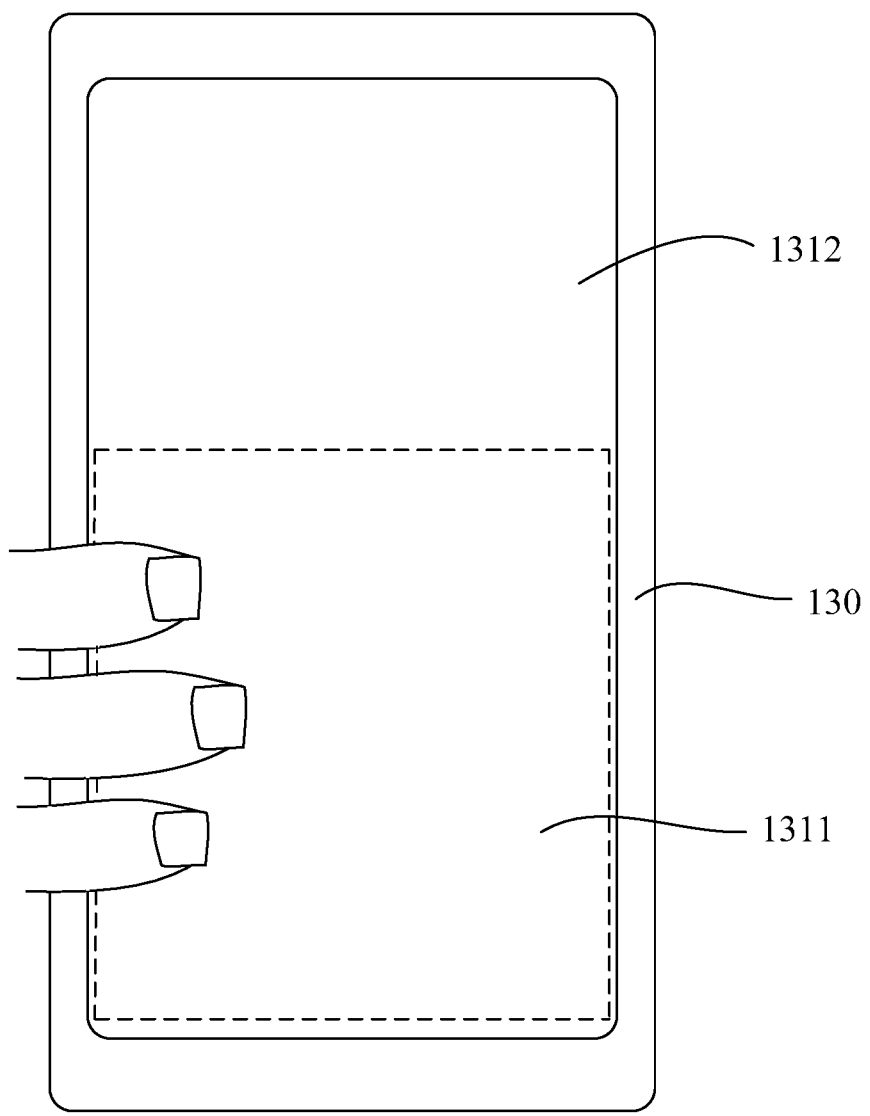
FIG. 20 is a schematic diagram of a touch operation of a user according to implementations.
Figure 21:
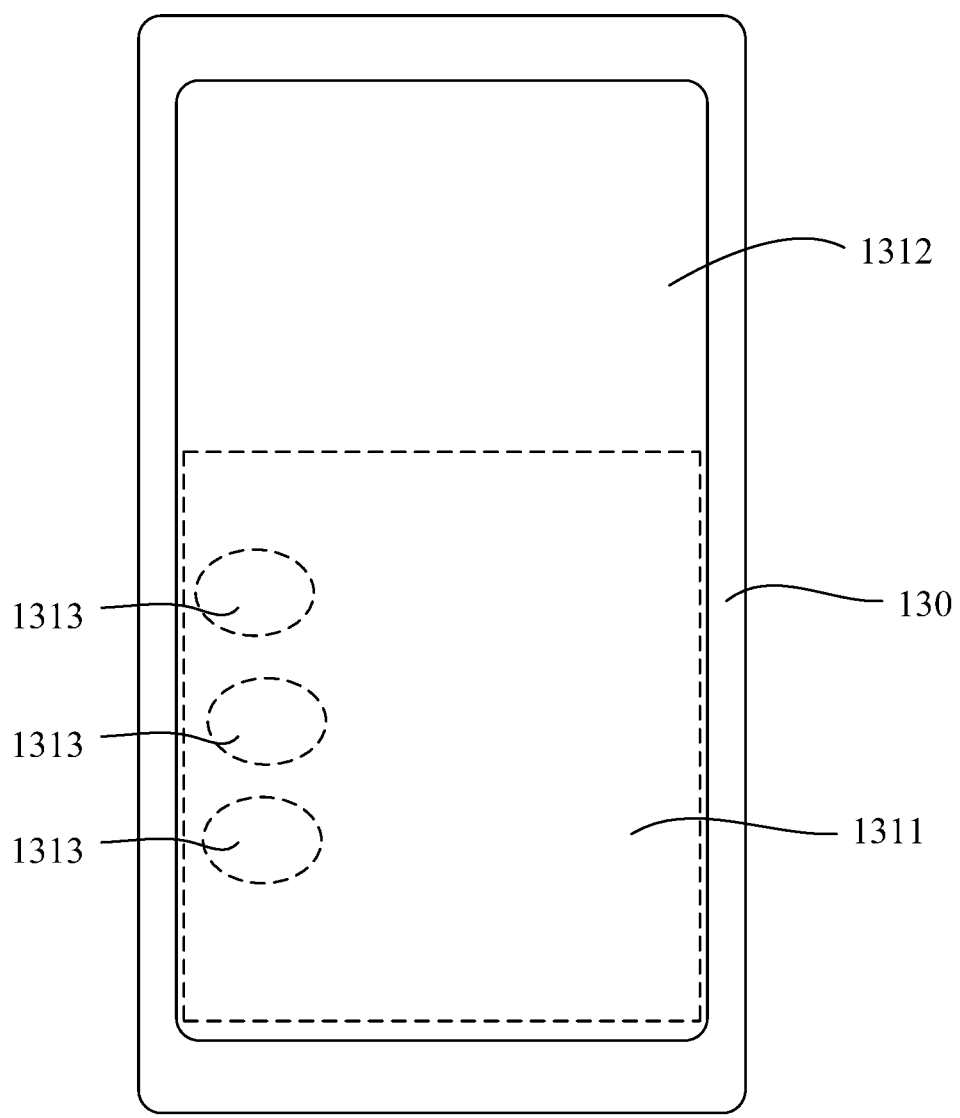
FIG. 21 is a schematic diagram of selection of target touch areas according to implementations.
Figure 30:
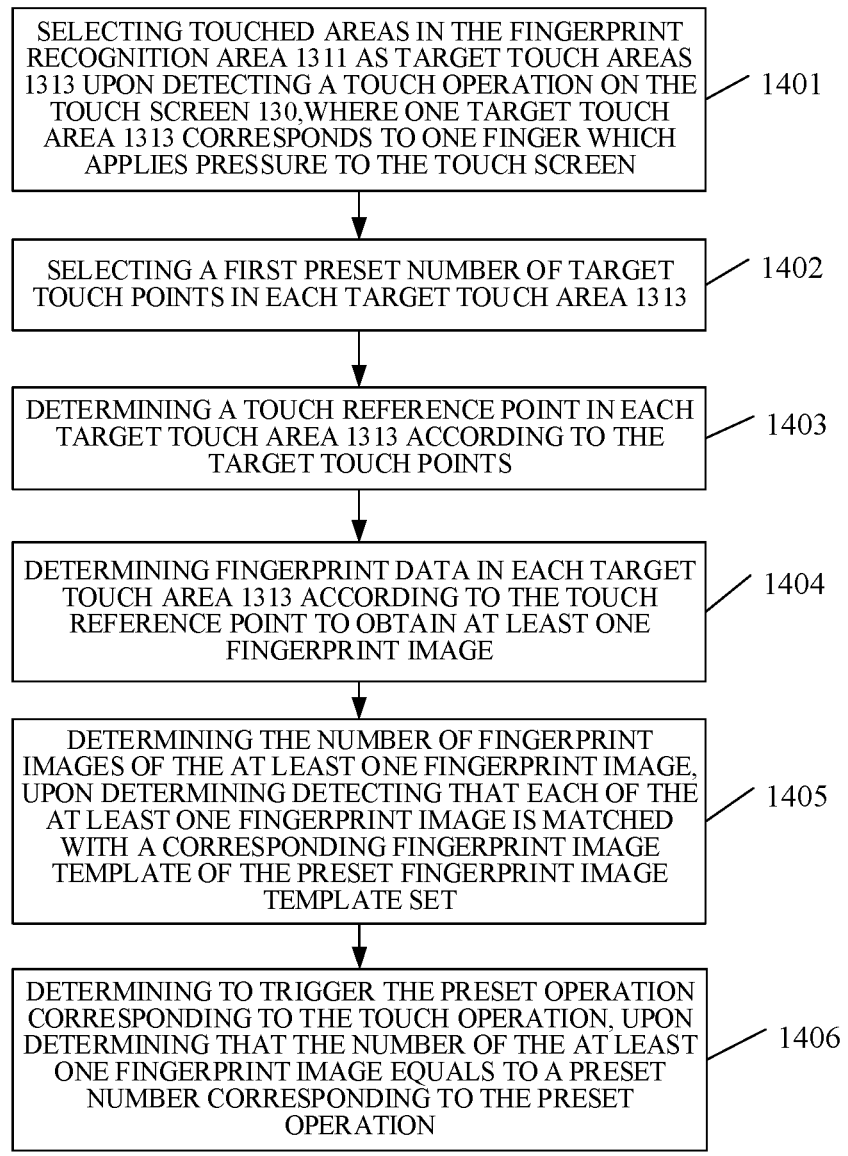
FIG. 30 is a schematic flow chart of a method for fingerprint recognition according to the third implementation.

The touch screen 130 has a touch function, and the touch screen 130 can detect a touch operation of the user on the touch screen 130 and a position(s) of the touch operation. When the touch operation on the touch screen 130 is detected, the touched areas in the fingerprint recognition area 1311 are selected as the target touch areas 1313 according to the position of the touch operation. FIG. 20 is a schematic diagram of a touch operation of a user according to implementations. FIG. 21 is a schematic diagram of selection of target touch areas according to implementations. In this example, the electronic device 100 has a multi-point fingerprint recognition function, and the fingerprint recognition area 1311 occupies a part of the touch area 1312. When a touch operation is applied to the touch screen 130 by a preset number of fingers of the user (for example, three fingers as illustrated in FIG. 30) and the touch operation is applied to the fingerprint recognition area 1311, areas touched by the preset number of fingers are the target touch areas 1313. It can be understood that the preset number is not limited to the number illustrated in this example, and may be one or other numbers. In the case that the touch screen 130 is a capacitive touch screen, when the touch screen 130 is touched by the user, capacitances of the touch screen 130 will change. Generally, the change of the capacitances of the touch screen 130 is related to tightness between the finger of the user and the touch screen 130 touched by the finger. When the touch screen 130 is touched by the user, capacitances of touched positions of the touch screen 130 are reduced. The harder (tighter) the touch, the greater the capacitance reduction of the touched positions. Capacitance of a position of the touch screen 130 with the maximum pressure of the finger has the greatest capacitance reduction. It can be seen that when the touch screen 130 is a capacitive touch screen, the target touch areas 1313 can be determined according to the change of the capacitances of the touch screen 130.

When the electronic device 100 has a multi-point fingerprint recognition function or has a full-screen fingerprint recognition function, fingerprints of multiple fingers of the user can be simultaneously recognized, thereby realizing a higher level of protection of user information. When the touch operation refers to different preset operations, it may be necessary to collect fingerprint information of different numbers of fingers of the user. For example, if the touch operation refers to a simple unlock operation for a lock screen interface, fingerprint information of one finger is collected; if the touch operation refers to a payment operation requiring a high security level, fingerprint information of two or more fingers is collected.

In a scenario, when the electronic device is held by multiple fingers of one hand or both hands of the user, the touch screen 130 is touched by the user, and the processor 121 detects a touch operation on the touch screen 130 and controls the fingerprint sensor 150 corresponding to each target touch area 1313 to detect the fingerprint image in each target touch area 1313 to obtain at least one fingerprint image.

At 1203, determine whether each of the at least one fingerprint image is matched with a corresponding fingerprint image template of a preset fingerprint image template set.

The fingerprint image collected is compared with a corresponding fingerprint image template of the preset fingerprint image template set to determine whether the fingerprint image matches the corresponding fingerprint image template. When a matching degree between the fingerprint image and the corresponding fingerprint image template is greater than or equal to a preset matching degree, the fingerprint image matches the corresponding fingerprint image template. When the matching degree between the fingerprint image and the corresponding fingerprint image template is less than the preset matching degree, the fingerprint image does not match the corresponding fingerprint image template. For example, the preset matching degree can be, but is not limited to, 85%.

In general, characteristics of the fingerprint of the user include global features and local features. The global feature generally includes the overall shape of the fingerprint, such as, a loop, an arch, or a whorl. Since the texture of the fingerprint is usually not continuous, and not smooth and straight, but often breaks, or forks or turns. The breakpoints of the breaks, the bifurcation points of the forks, or the turning points of the turns are important feature points for identifying the uniqueness of the fingerprint, which are also referred to as local features of the fingerprint. The fingerprint image collected is compared with the corresponding fingerprint image template in the preset fingerprint image template set as follows. Generally, the type and the position of the feature points of the fingerprint image are respectively compared with the type and the position of the feature points of the corresponding fingerprint image template of the preset fingerprint image template set, to determine whether the fingerprint image matches the corresponding fingerprint image template.

At 1204, a preset operation corresponding to the touch operation is triggered, upon determining that each of the at least one fingerprint image is matched with a corresponding fingerprint image template of the preset fingerprint image template set.

In an example, the preset fingerprint image template set includes multiple fingerprint image templates. For example, the preset fingerprint image template set includes: a fingerprint image template 1 (a fingerprint image template of a right thumb), a fingerprint image template 2 (a fingerprint image template of a right index finger), . . . , a fingerprint image template 5 (a fingerprint image template of a right little finger), a fingerprint image template 6 (a fingerprint image template of a left thumb), a fingerprint image template 7 (a fingerprint image template of a left index finger), . . . , a fingerprint image template 10 (a fingerprint image template of a left little finger). In the case that there are five fingerprint images, when the five fingerprint images are matched with five fingerprint image templates of the preset fingerprint image template set, the preset operation corresponding to the touch operation is performed.

In this implementation, the touched areas in the fingerprint recognition area 1311 are selected as the target touch areas 1313 upon detecting the touch operation on the touch screen 130. The fingerprint image in each target touch area 1313 is acquired. The preset operation corresponding to the touch operation is triggered, upon determining that each of the at least one fingerprint image is matched with a corresponding fingerprint image template of the preset fingerprint image template set. It is possible to achieve multi-fingerprint recognition of the touch screen 130. Furthermore, according to this implementation, the touched areas in the fingerprint recognition area 1311 are first selected as the target touch areas 1313, and then the fingerprint image in each target touch area 1313 is acquired. Compared with acquiring data in the entire fingerprint recognition area 1311 to obtain a fingerprint image, the amount of data of acquiring the fingerprint image can be reduced.

In an implementation, the fingerprint image in each target touch area is acquired (1202) to obtain the at least one fingerprint image as follows. Select a first preset number of target touch points in each target touch area 1313. Determine a touch reference point in each target touch area 1313 according to the target touch points. Determine fingerprint data of each target touch area 1313 according to the touch reference point and acquire the fingerprint image in each target touch area 1313 according to the fingerprint data.

Figure 22:
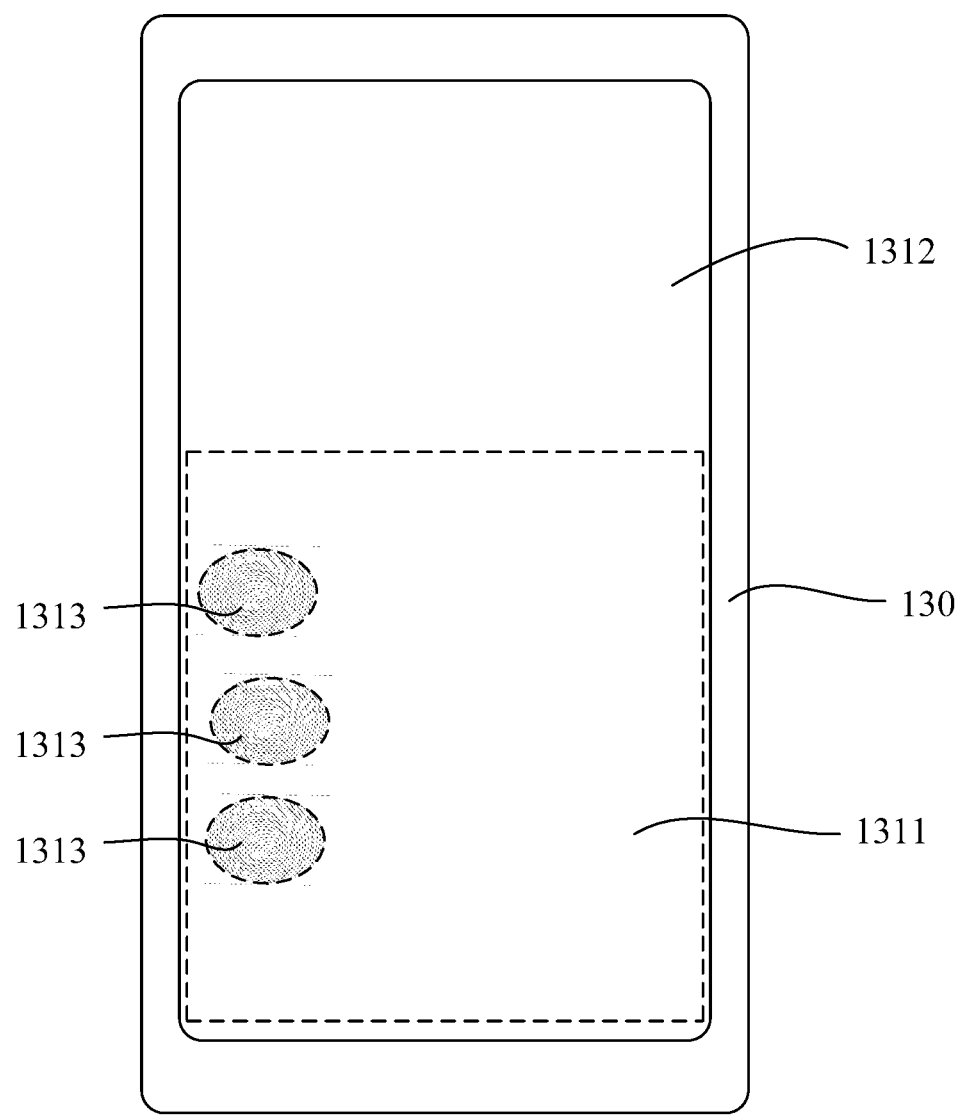
FIG. 22 is a schematic diagram of all touch points in a fingerprint recognition area.
Figure 23:
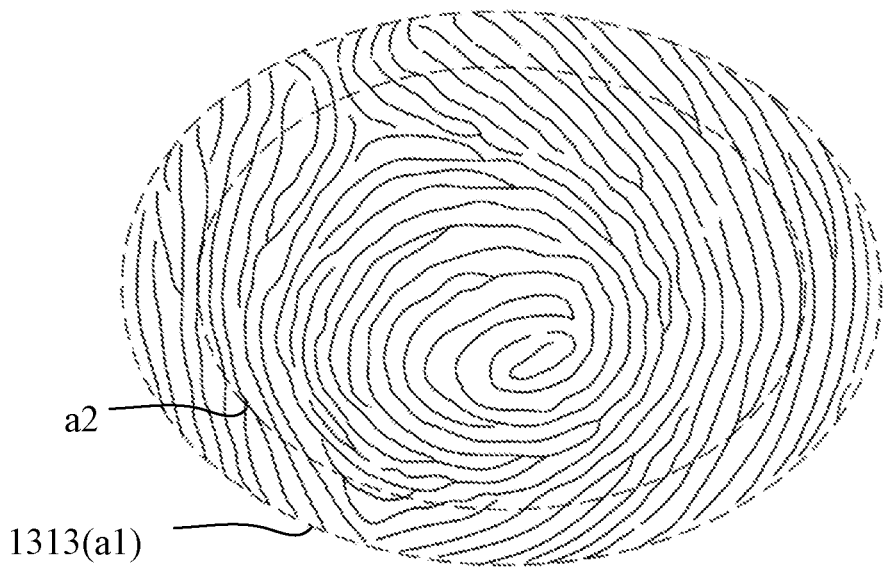
FIG. 23 is a schematic diagram of a first preset number of touch points in the fingerprint recognition area.

FIG. 22 is a schematic diagram of all touch points in a fingerprint recognition area. FIG. 23 is a schematic diagram of a first preset number of touch points in the fingerprint recognition area. When the fingerprint of the user is pressed on the touch screen 130 and is pressed corresponding to the fingerprint recognition area 1311, touch units (for example, the first electrodes 311 and the second electrodes 331 described above) in the fingerprint recognition area 1311 can sense multiple touch points (such as all the touch points in the dotted box a1). Select, from the multiple touch points, a first preset number of touch points (such as all the touch points in the dotted box a2) as the target touch points. The touch reference point is determined according to a relation among the first preset number of target touch points. The touch reference point may or may not be one of the first preset number of target touch points. The fingerprint data in each target touch area is determined according to the touch reference point, to obtain the fingerprint image in each target touch area. For one target touch area 1313, this fingerprint image may be only a partial image of the fingerprint of a certain finger of the user.

In an example, the fingerprint data in each target touch area 1313 is determined according to the touch reference point, to obtain the fingerprint image in each target touch area 1313 as follows. A target fingerprint area 1314 in each target touch area 1313 is determined according to the touch reference point, and fingerprint data in the target fingerprint area 1314 is acquired to obtain the fingerprint image. How the target fingerprint area 1314 in each target touch area 1313 is determined according to the touch reference point will be described in detail below.

According to this implementation, the first preset number of target touch points of the target touch area 1313 are selected, the touch reference point is determined according to the first preset number of target touch points, and the target fingerprint area 1314 is determined according to the touch reference point. It is possible to only acquire data in the target fingerprint area 1314 as the fingerprint data, which can reduce the amount of data to be read. The comparison between the fingerprint image obtained according to the fingerprint data and a fingerprint image template can be achieved much quicker, which is beneficial to improving a processing speed of fingerprint recognition.

Figure 24:
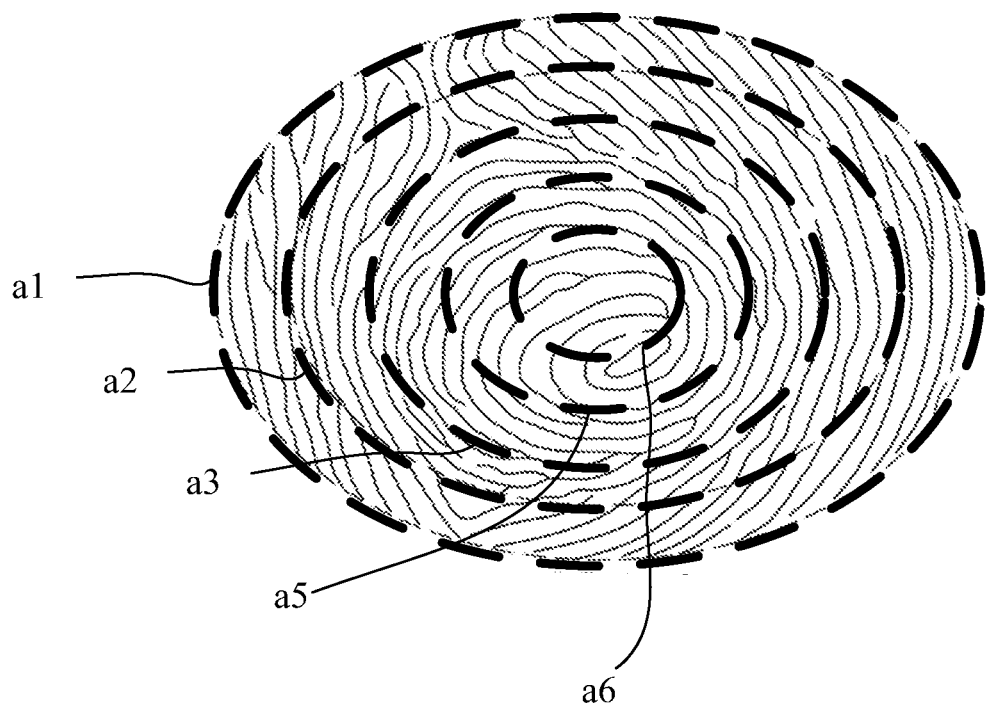
FIG. 24 is a schematic diagram illustrating selection of target touch points according to implementations.

In an implementation, the first preset number of target touch points in each target touch area 1313 are selected as follows. For each of a second preset number of touch points in each target touch area 1313, a pressing intensity (force) is determined. Select, according to a magnitude of the pressing intensity, a first preset number of touch points to be the target touch points. The first preset number is less than the second preset number. FIG. 24 is a schematic diagram illustrating selection of target touch points according to implementations.

In this implementation, for each of the second preset number of touch points in each target touch area 1313, a pressing intensity is determined. The second preset number of touch points are sorted in a descending order of the pressing intensities. The top first preset number of touch points are selected, where the first preset number is less than the second preset number. For example, in the case that the first preset number is 40 and the second preset number is 70, 70 touch points are sorted in a descending order of pressing intensities, and top 40 touch points are selected to be target touch points. In other examples, the second preset number of touch points are sorted in an ascending order of the pressing intensities. The last first preset number of touch points are selected, where the first preset number is less than the second preset number. For example, in the case that the first preset number is 50 and the second preset number is 75, 75 touch points are sorted in an ascending order of pressing intensities, and last 50 touch points are selected to be target touch points.

Furthermore, a touch point with a highest pressing intensity is selected from the first preset number of touch points as the target reference point. Generally, the pressing intensity of each target touch area 1313 is related to the tightness between the finger of the user and the touch screen 130 touched by the finger. Within a pressed portion of the touch screen 130 pressed by the finger of the user, the closer to the center of the pressed portion, the greater the pressing intensity on the touch screen 130, and the further away from the center of the pressed portion, the smaller the pressing intensity on the touch screen 130. In this implementation, the broken line a6 is closest to the center of the pressed portion, and the broken line a1 is farthest from the center of the pressed portion. Therefore, it is more accurate to select the touch point with the highest pressing intensity from the first preset number of touch points as the target reference point. Within the pressed portion of the touch screen 130 pressed by the finger of the user, the greater the pressing intensity of a portion of the finger of the user on the touch screen 130, the closer the distance between the portion of the finger of the user and the touch screen 130, the clearer the image sensed by the fingerprint sensor 150; the smaller the pressing intensity of a portion of the finger of the user on the touch screen 130, the further the distance between the portion of the finger of the user and the touch screen 130, and less clear the image sensed by the fingerprint sensor 150. In this implementation, select, from among the second preset number of touch points, the top first preset number of touch points according to the descending order of the pressing intensities, so that the definition of the fingerprint image can be improved.

Furthermore, in this implementation, select the second preset number of touch points in each target touch area 1313, and then select, from the second preset number of touch points, the first preset number of touch points with the highest pressing intensity instead of all the touch points as the target touch points. It is beneficial to reduce the amount of data processed on the fingerprint image.

Figure 25:
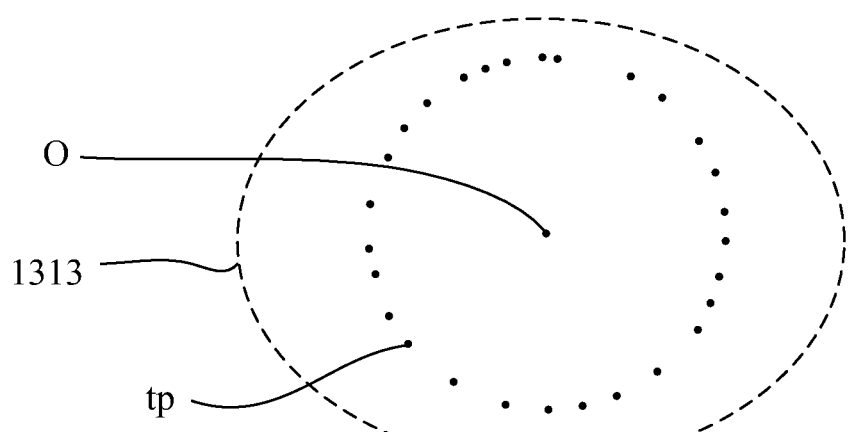
FIG. 25 is a schematic diagram illustrating selection of a touch reference point according to implementations.

FIG. 25 is a schematic diagram illustrating selection of a touch reference point according to implementations. In an implementation, the touch reference point O is a point that is at a same distance from each of the first preset number of target touch points tp. Alternatively, in an implementation, the touch screen 130 includes a capacitive touch screen and the touch reference point is a point that has a same capacitance difference between each of the first preset number of target touch points.

In this implementation, the touch reference point is a point that is at a same distance from each of the first preset number of target touch points, that is, among the first preset number of target touch points, the touch reference point is a physical center of the target touch points. Generally, within the pressed portion of the touch screen 130 pressed by the finger of the user, the touch points are distributed around a touch point located in the center. If there is a point having a same distance to the preset number of target touch points, this point can be regarded as the physical center of the first preset number of target touch points, that is, this point can be regarded as the touch reference point.

In the case that the touch screen 130 is a capacitive touch screen, when the touch screen 130 is touched by the finger of the user, capacitances of the touch screen 130 change. A touch point with a largest change in capacitance is where the finger of the user presses the touch screen 130 to the greatest extent. Due to the inherent characteristics of the finger of the user, when the touch screen 130 is pressed by the finger of the user, a center of the pressing portion of the finger of the user pressing the touch screen 130 is in closest contact with the touch screen 130, and other touch points centered on the center of the pressing portion have the same capacitance change with a touch point at the center of the pressing portion. If there is a point that has a same capacitance difference between the first preset number of target touch points, this point may be regarded as the center of the first preset number of target touch points, that is, this point can be considered as the touch reference point.

According to this implementation, the touch reference point is at a same distance from the first preset number of target touch points or has a same capacitance difference between the first preset number of target touch points. The target fingerprint area is determined according to the touch reference point. As such, the fingerprint image collected in the target fingerprint area is of high reliability.

Figure 26:
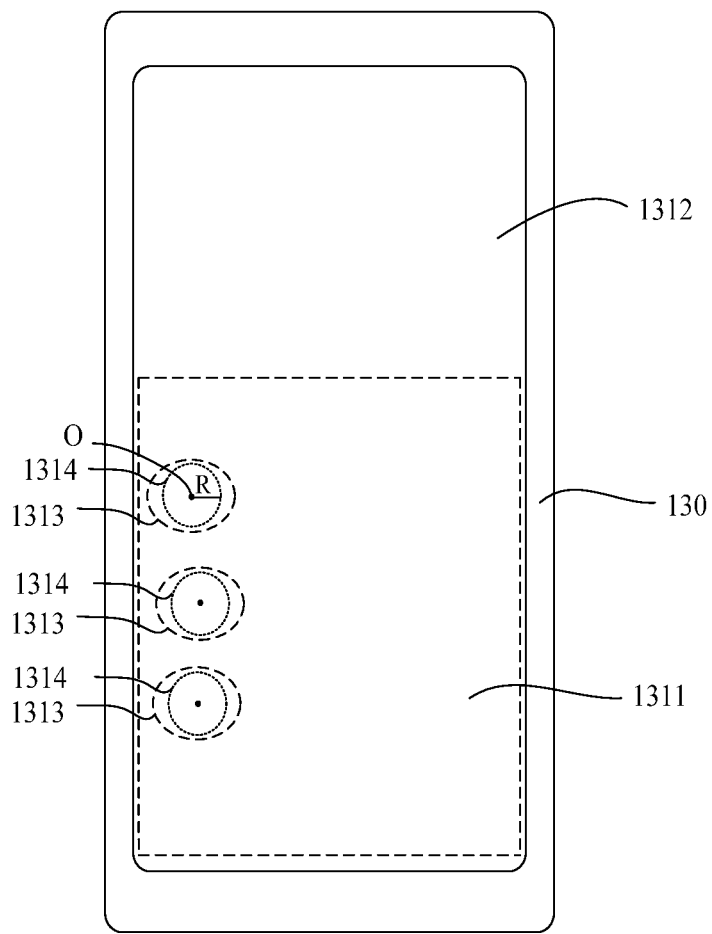
FIG. 26 is a schematic diagram of target touch areas according to implementations.

FIG. 26 is a schematic diagram of target touch areas according to implementations. In one implementation, the fingerprint data in each target touch area 1313 is determined according to the touch reference point and the fingerprint image in each target touch area 1313 is acquired according to the fingerprint data as follows. A preset distance threshold R is acquired. For each target touch area, a circular area with the touch reference point O as a center of a circle and the preset distance threshold R as a radius is determined to be a target fingerprint area 1314, where the target fingerprint area 1314 is within the target touch area 1313. Fingerprint data in each target fingerprint area 1314 is acquired to obtain the fingerprint image in each target touch area. In this implementation, after the touch reference point is determined, the preset distance threshold is acquired. The target fingerprint area 1314 can be the circular area with the touch reference point as the center of the circle and the preset distance threshold as the radius. For example, in the case that the preset distance threshold is 10 mm, a circular area with the touch reference point as a center of a circle and 10 mm as a radius is determined to be the target fingerprint area 1314.

In this implementation, the target fingerprint area 1314 is the circular area with the touch reference point as the center of the circle and the preset distance threshold as the radius. Therefore, after the touch reference point is determined, the target fingerprint area 1314 can be determined relatively quickly. Thereby, time taken from the determination of the touch reference point to the determination of the target fingerprint area 1314 is shortened, which is advantageous for improving the processing speed of fingerprint recognition.

Figure 27:
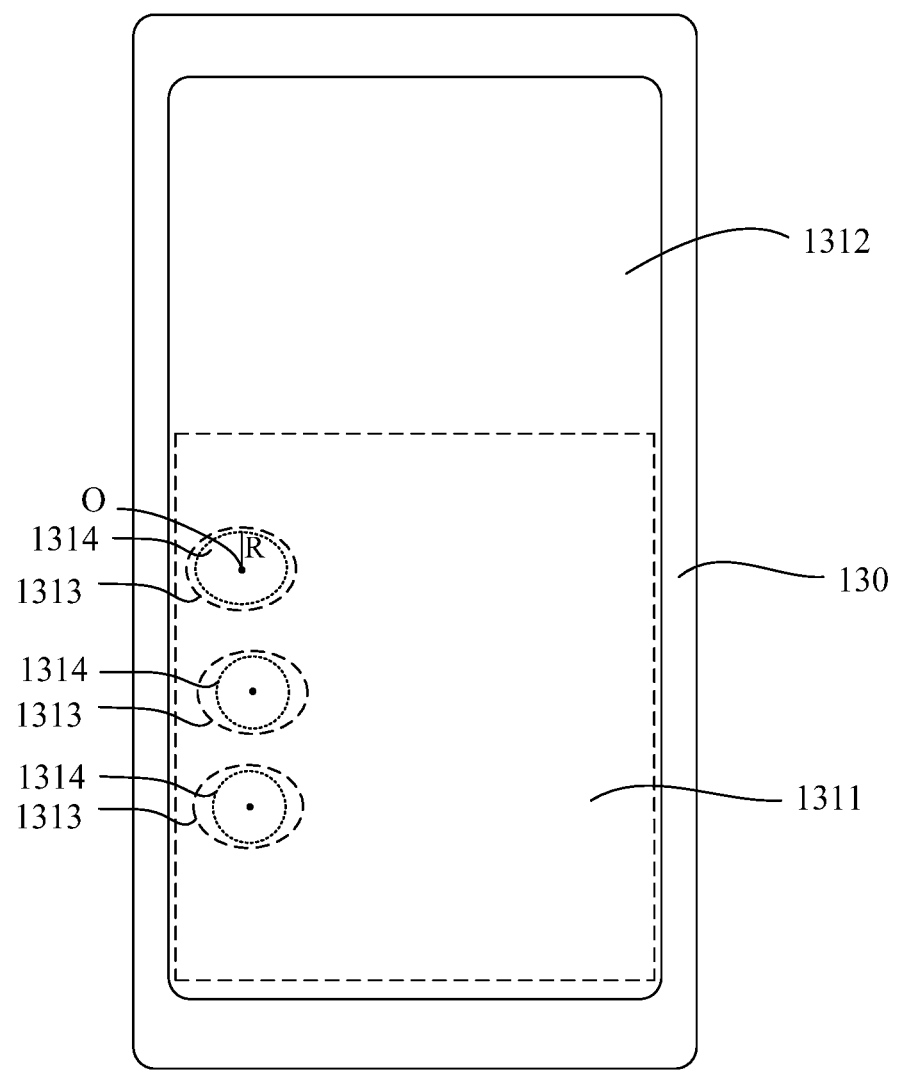
FIG. 27 is a schematic diagram of target touch areas according to other implementations.

FIG. 27 is a schematic diagram of target touch areas according to other implementations. In one example, the fingerprint data in each target touch area 1313 is determined according to the touch reference point and the fingerprint image in each target touch area 1313 is acquired according to the fingerprint data as follows. A preset distance threshold R is acquired. For each target touch area, an elliptical area with the touch reference point O as a center and the preset distance threshold R as a half of a short axis is determined to be a target fingerprint area 1314, where the target fingerprint area 1314 is within the target touch area 1313. Fingerprint data in each target fingerprint area 1314 is acquired to obtain the fingerprint image in each target touch area.

For example, the preset distance threshold may be, but is not limited to, 10 millimeters. In this implementation, the target fingerprint area 1314 is the elliptical area with the touch reference point O as the center and the preset distance threshold R as the half of the short axis. The target fingerprint area 1314 is more similar to the pressed portion of the touch screen 130 pressed by the finger of the user in terms of shape, which is advantageous for improving the accuracy of fingerprint recognition.

Figure 28:
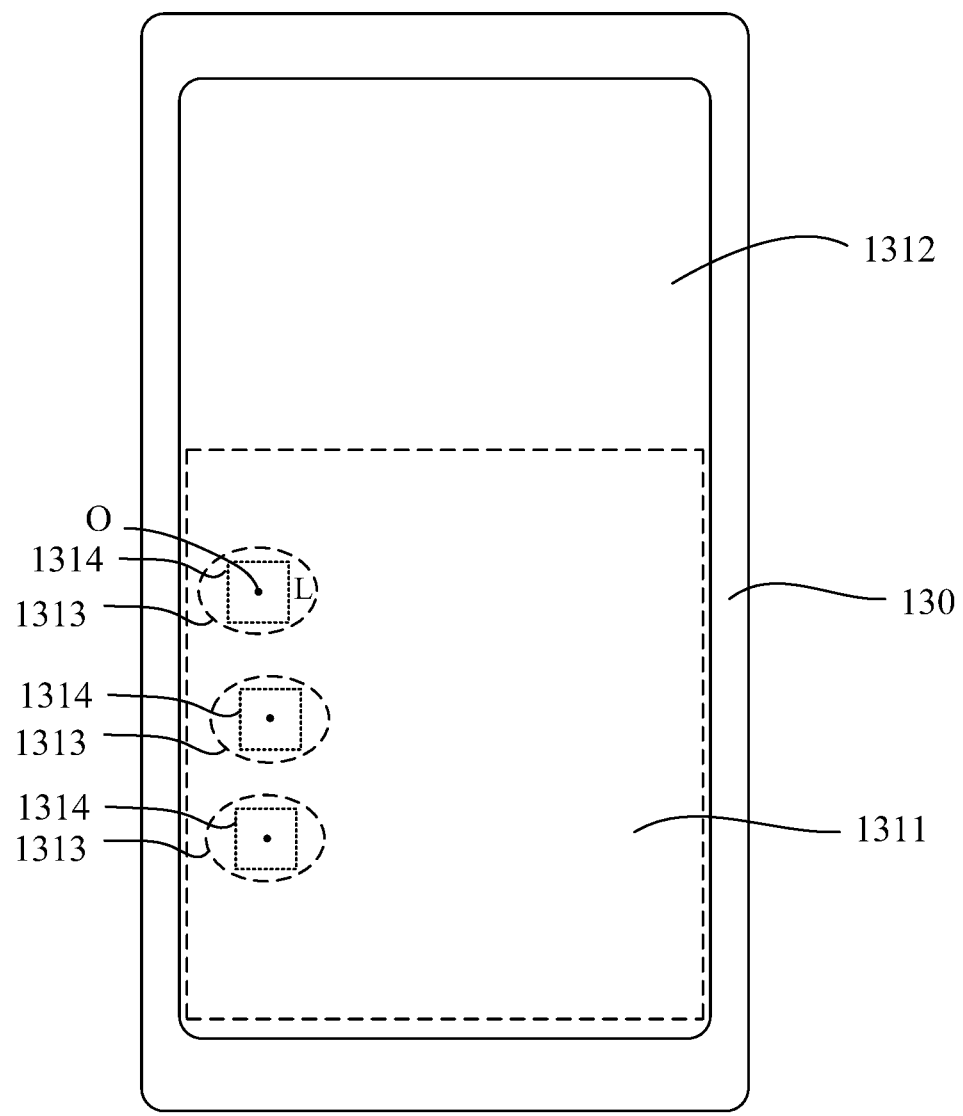
FIG. 28 is a schematic diagram of target touch areas according to other implementations.

FIG. 28 is a schematic diagram of target touch areas according to other implementations. In one implementation, the fingerprint data in each target touch area 1313 is determined according to the touch reference point to obtain the fingerprint image in each target touch area 1313 as follows. A preset distance threshold L is acquired. For each target touch area, a rectangular area with the touch reference point as a center and the preset distance threshold L as an edge length is determined to be a target fingerprint area 1314, where the target fingerprint area 1314 is within the target touch area 1313. Fingerprint data in each target fingerprint area 1314 is acquired to obtain the fingerprint image in each target touch area.

In this implementation, after the preset distance threshold is acquired, determine the rectangular area with the touch reference point as the center and the preset distance threshold as the edge length to be the target fingerprint area 1314. The center can be the intersection of the diagonal or the center of gravity of the rectangle. For example, if the preset distance threshold is 20 mm, a square area with the touch reference point as a center and 20 mm as an edge length is determined to be the target fingerprint area 1314. The fingerprint image of the user can be obtained by just acquiring the fingerprint data in the square area.

In this implementation, the target fingerprint area 1314 is the rectangular area with the touch reference point as the center and the preset distance threshold as the edge length. Therefore, after the touch reference point is determined, the target fingerprint area 1314 can be determined relatively quickly. Thereby, time taken from the determination of the touch reference point to the determination of the target fingerprint area 1314 can be shortened, which is advantageous for improving the processing speed of fingerprint recognition.

In an implementation, after determining that each of the at least one fingerprint image is matched with a corresponding fingerprint image template of the preset fingerprint image template set, the following is further conducted. The number of fingerprint images of the at least one fingerprint image are determined. Determine to trigger the preset operation corresponding to the touch operation, upon determining that the number of the at least one fingerprint image equals to a preset number corresponding to the preset operation.

In this implementation, the electronic device can achieve multi-finger recognition all at once. Each of the multiple fingerprint images acquired is compared with a fingerprint image template. When each of the multiple fingerprint images is matched with a fingerprint image template and the number of the multiple fingerprint images equals to the preset number, the fingerprint recognition succeeds and the preset operation corresponding to the touch operation is triggered.

According to this implementation, after each of the at least one fingerprint image is matched with a fingerprint image template, determine the number of the at least one fingerprint image, and further determine the preset operation corresponding to the touch operation and the preset number corresponding to the preset operation. In the case that the number of the at least one fingerprint image equals to the preset number, the preset operation is triggered. It is possible to improve security of fingerprint recognition.

Figure 29:
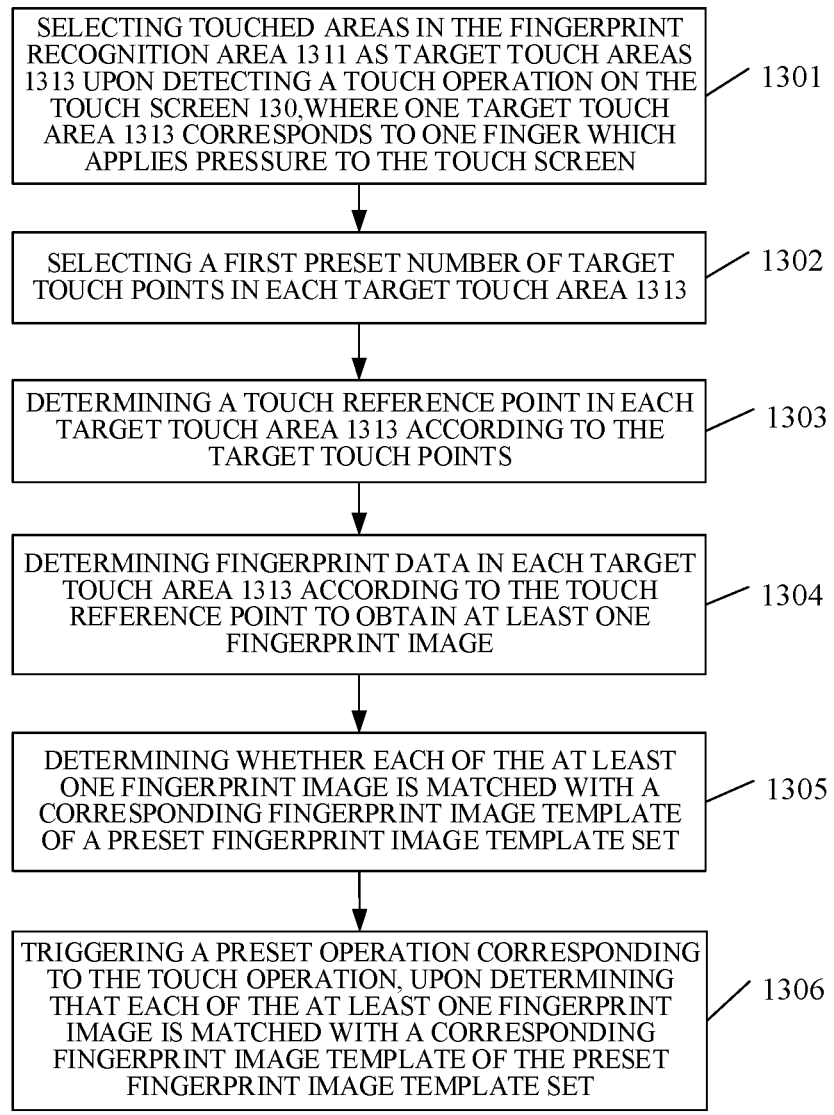
FIG. 29 is a schematic flow chart of a method for fingerprint recognition according to the second implementation.

FIG. 29 is a schematic flow chart of a method for fingerprint recognition according to the second implementation. The method is applicable to an electronic device 100. The electronic device 100 includes a touch screen 130 and a fingerprint sensor 150. The touch screen 130 has a fingerprint recognition area 1311. The fingerprint sensor 150 is disposed in an area corresponding to the fingerprint recognition area 1311. The fingerprint recognition area 1311 can be pressed by at least two fingers at the same time. The method includes 1301, 1302, 1303, 1304, 1305, and 1306, which are described in detail below.

At 1301, touched areas in the fingerprint recognition area 1311 are selected as target touch areas 1313 upon detecting a touch operation on the touch screen 130. One target touch area 1313 corresponds to one finger which applies pressure to the touch screen.

At 1302, select a first preset number of target touch points in each target touch area 1313.

At 1303, determine a touch reference point in each target touch area 1313 according to the target touch points.

At 1304, determine fingerprint data in each target touch area 1313 according to the touch reference point to obtain at least one fingerprint image.

At 1305, determine whether each of the at least one fingerprint image is matched with a corresponding fingerprint image template of a preset fingerprint image template set. For details, reference can be made to 1203, and the disclosure is not repeated herein.

At 1306, a preset operation corresponding to the touch operation is triggered, upon determining that each of the at least one fingerprint image is matched with a corresponding fingerprint image template of the preset fingerprint image template set. For details, reference can be made to 1204, and the disclosure is not repeated herein.

According to this implementation, the touch screen 130 has a fingerprint recognition area 1311, and the fingerprint sensor 150 is disposed in an area corresponding to the fingerprint recognition area 1311. The fingerprint recognition area 1311 can be simultaneously pressed by at least two fingers. In the case that the electronic device 100 has a multi-point fingerprint recognition function or a full-screen fingerprint recognition function, and the area of the fingerprint recognition area 1311 is larger than the area occupied by the finger operated by the user, some areas of the fingerprint recognition area 1311 receives no touch operation. Therefore, in this implementation, when the touch operation on the touch screen 130 is detected, the touched areas in the fingerprint recognition area 1311 are selected as the target touch areas 1313. Thereafter, data in the target touch areas 1313 rather than data in the entire fingerprint recognition area 1311 is processed. Therefore, the amount of data processed in the subsequent acquisition of the fingerprint image can be reduced, which is advantageous for improving the speed of the fingerprint recognition.

Furthermore, the first preset number of target touch points in each target touch area 1313 are selected; the touch reference point in each target touch area 1313 is then determined; according to the touch reference point, the target fingerprint area 1314 is determined. It is possible to only acquire data in the target fingerprint area 1314 as the fingerprint data, which can reduce the amount of data to be acquired and improve the processing speed of fingerprint recognition. For the process of determining the target fingerprint area 1314 according to the touch reference point, reference can be made to the foregoing description and details are not described herein again.

FIG. 30 is a schematic flow chart of a method for fingerprint recognition according to the third implementation. The method is applicable to an electronic device 100. The electronic device 100 includes a touch screen 130 and a fingerprint sensor 150. The touch screen 130 has a fingerprint recognition area 1311. The fingerprint sensor 150 is disposed in an area corresponding to the fingerprint recognition area 1311. The fingerprint recognition area 1311 can be pressed by at least two fingers at the same time. The method includes 1401, 1402, 1403, 1404, 1405, and 1406 which are described in detail below.

At 1401, touched areas in the fingerprint recognition area 1311 are selected as target touch areas 1313 upon detecting a touch operation on the touch screen 130. One target touch area 1313 corresponds to one finger which applies pressure to the touch screen.

At 1402, select a first preset number of target touch points in each target touch area 1313.

At 1403, determine a touch reference point in each target touch area 1313 according to the target touch points.

At 1404, determine fingerprint data in each target touch area 1313 according to the touch reference point to obtain at least one fingerprint image.

At 1405, the number of fingerprint images of the at least one fingerprint image is determined, upon determining that each of the at least one fingerprint image is matched with a corresponding fingerprint image template of the preset fingerprint image template set.

At 1406, determine to trigger the preset operation corresponding to the touch operation, upon determining that the number of the at least one fingerprint image equals to a preset number corresponding to the preset operation.

According to this implementation, after each of the at least one fingerprint image is matched with a corresponding fingerprint image template, determine the number of the at least one fingerprint image, and further determine the preset operation corresponding to the touch operation and the preset number corresponding to the preset operation. In the case that the number of the at least one fingerprint image equals to the preset number, the preset operation is triggered. It is possible to improve security of fingerprint recognition.

Figure 31:
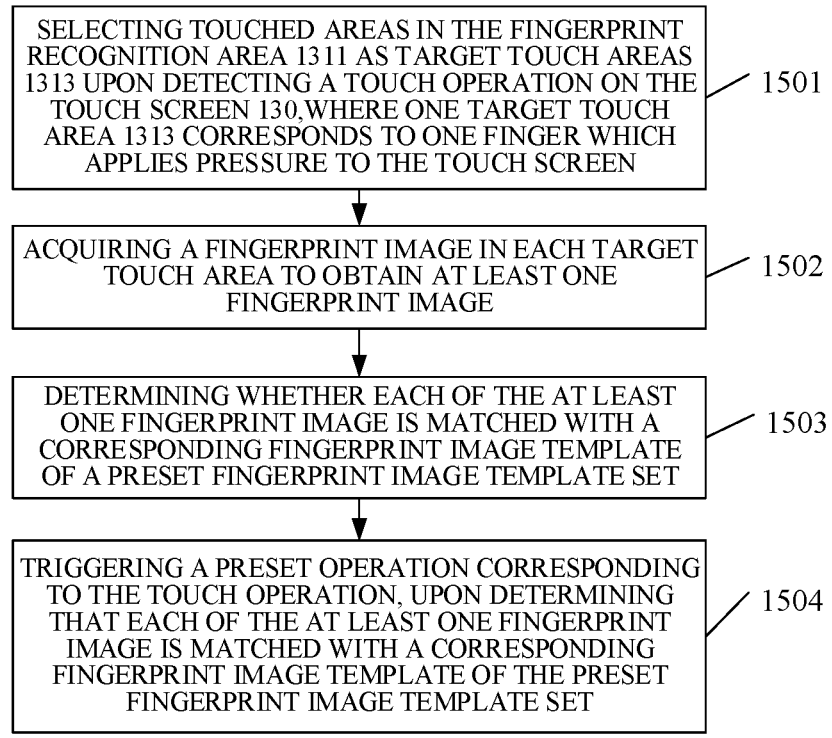
FIG. 31 is a schematic flow chart of a method for fingerprint recognition according to a fourth implementation.

FIG. 31 is a schematic flow chart of a method for fingerprint recognition according to a fourth implementation. The method is applicable to the above electronic device 100. The electronic device 100 includes a touch screen 130 and a fingerprint sensor 150. The touch screen 130 has a fingerprint recognition area 1311. The fingerprint sensor 150 is disposed in an area corresponding to the fingerprint recognition area 1311. The fingerprint recognition area 1311 can be pressed by at least two fingers at the same time. The method includes 1501, 1502, 1503, and 1504, which are described in detail below.

At 1501, touched areas in the fingerprint recognition area 1311 are selected as target touch areas 1313 upon detecting a touch operation on the touch screen 130. One target touch area 1313 corresponds to one finger which applies pressure to the touch screen.

At 1502, a fingerprint image in each target touch area is acquired to obtain at least one fingerprint image. For details of 1501 and 1502, reference can be made to 1201 and 1202, and the disclosure is not repeated herein.

At 1503, determine whether each of the at least one fingerprint image is matched with a corresponding fingerprint image template of a preset fingerprint image template set. For details of 1503, reference can be made to 1203, and the disclosure is not repeated herein.

At 1504, a preset operation corresponding to the touch operation is triggered, upon determining that each of the at least one fingerprint image is matched with a corresponding fingerprint image template of the preset fingerprint image template set. For details of 1504, reference can be made to 1204, and the disclosure is not repeated herein.

Figure 32:
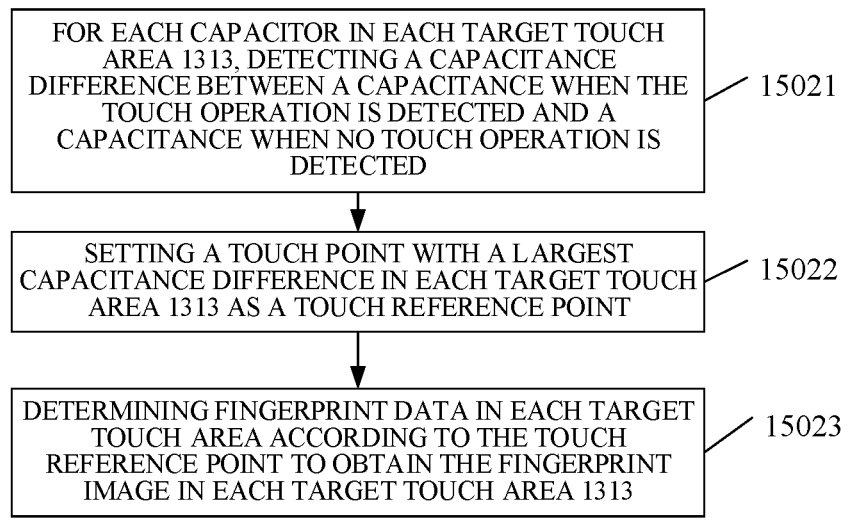
FIG. 32 is a schematic flow chart illustrating the operation 1502 of FIG. 31.

The touch screen includes a capacitive touch screen, and the touch screen includes multiple capacitors arranged in array. FIG. 32 is a schematic flow chart illustrating the operation 1502 of FIG. 31. In an implementation, the fingerprint image in each target touch area is acquired (1502) to obtain the at least one fingerprint image includes 15021, 15022, and 15023, which are detailed as follows.

At 15021, for each capacitor in each target touch area 1313, detect a capacitance difference between a capacitance when the touch operation is detected and a capacitance when no touch operation is detected.

At 15022, set a touch point with a largest capacitance difference in each target touch area 1313 as a touch reference point.

At 15023, determine fingerprint data in each target touch area according to the touch reference point to obtain the fingerprint image in each target touch area 1313.

In the case that the touch screen 130 is a capacitive touch screen, when the touch screen 130 is touched by the finger of the user, capacitances of the touch screen 130 change. A touch point with a largest change in capacitance is where the finger of the user presses the touch screen 130 to the greatest extent. Due to the inherent characteristics of the finger of the user, when the touch screen 130 is pressed by the finger of the user, a center of the pressing portion of the finger of the user pressing the touch screen 130 is in closest contact with the touch screen 130. Therefore, the touch point with the largest change in capacitance generally corresponds to a center of an entire fingerprint image. Generally, the change of the capacitances of the touch screen 130 is related to tightness between the finger of the user and the touch screen 130 touched by the finger. When the touch screen 130 is touched by the user, capacitances of touched positions of the touch screen 130 are reduced. The harder (tighter) the touch, the greater the capacitance reduction of the touched positions. Capacitance of a position of the touch screen 130 with the maximum pressure of the finger has the greatest capacitance reduction.

Figure 33:
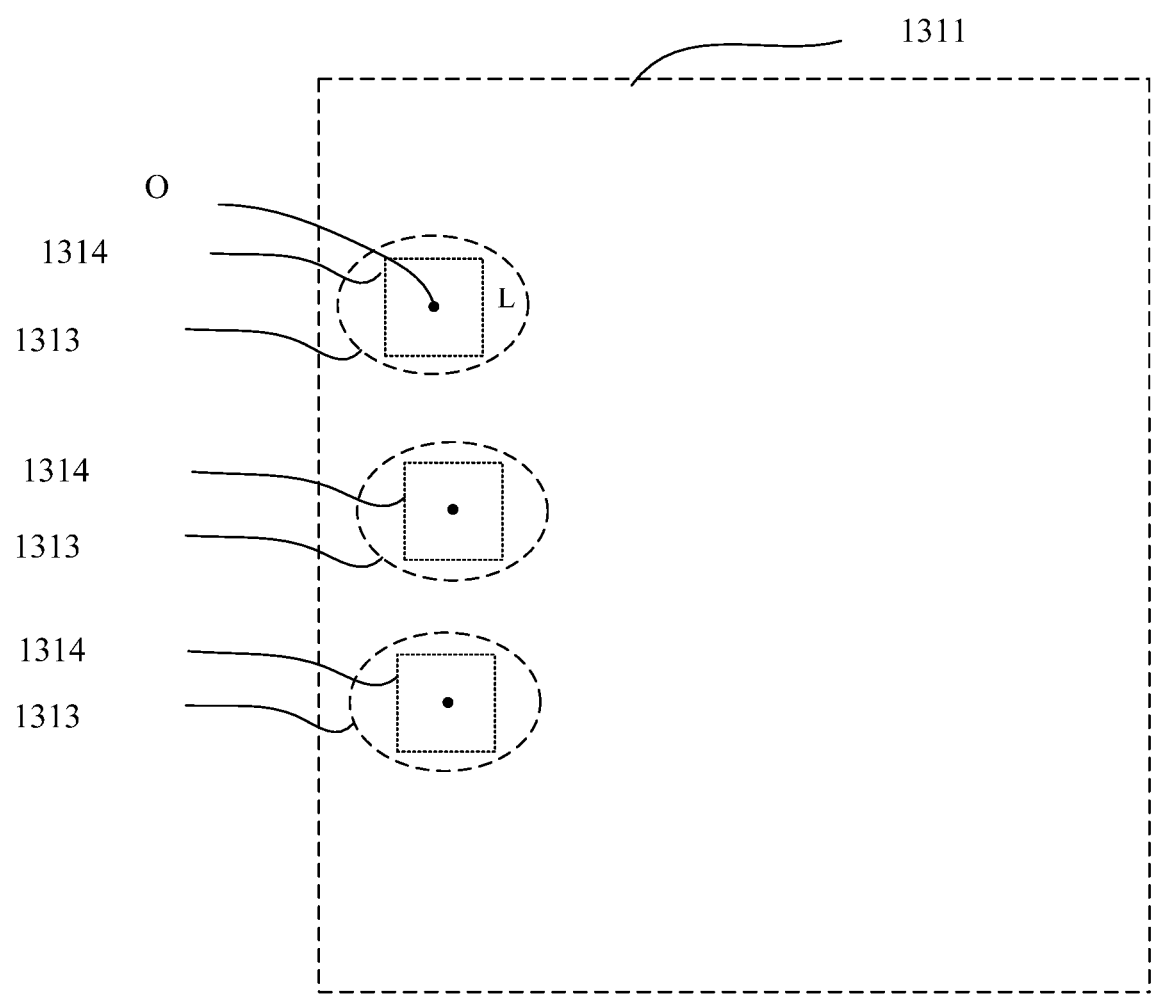
FIG. 33 is a schematic diagram of target fingerprint areas and target touch areas according to implementations.

FIG. 33 is a schematic diagram of target fingerprint areas and target touch areas according to implementations. In an implementation, determine (15023) fingerprint data in each target touch area according to the touch reference point to obtain the fingerprint image in each target touch area 1313 as follows. For each target touch area, a rectangular area with the touch reference point as a center O and a preset distance threshold L as an edge length is determined to be the target fingerprint area 1314, where the target fingerprint area 1314 is within the target touch area 1313. Fingerprint data in each target fingerprint area 1314 is acquired to obtain the fingerprint image in each target touch area. In this implementation, the target fingerprint area 1314 is the rectangular area with the touch reference point as the center and the preset distance threshold as the edge length. Therefore, the target fingerprint area 1314 can be determined relatively quickly. Thereby, time taken from the determination of the touch reference point to the determination of the target fingerprint area 1314 can be shortened, which is advantageous for improving the processing speed of fingerprint recognition. The preset distance threshold may be in the range of 4 mm~6 mm. Correspondingly, the size of the target fingerprint area 1314 is in the range of 8*8 mm²~12*12 mm².

Figure 34:
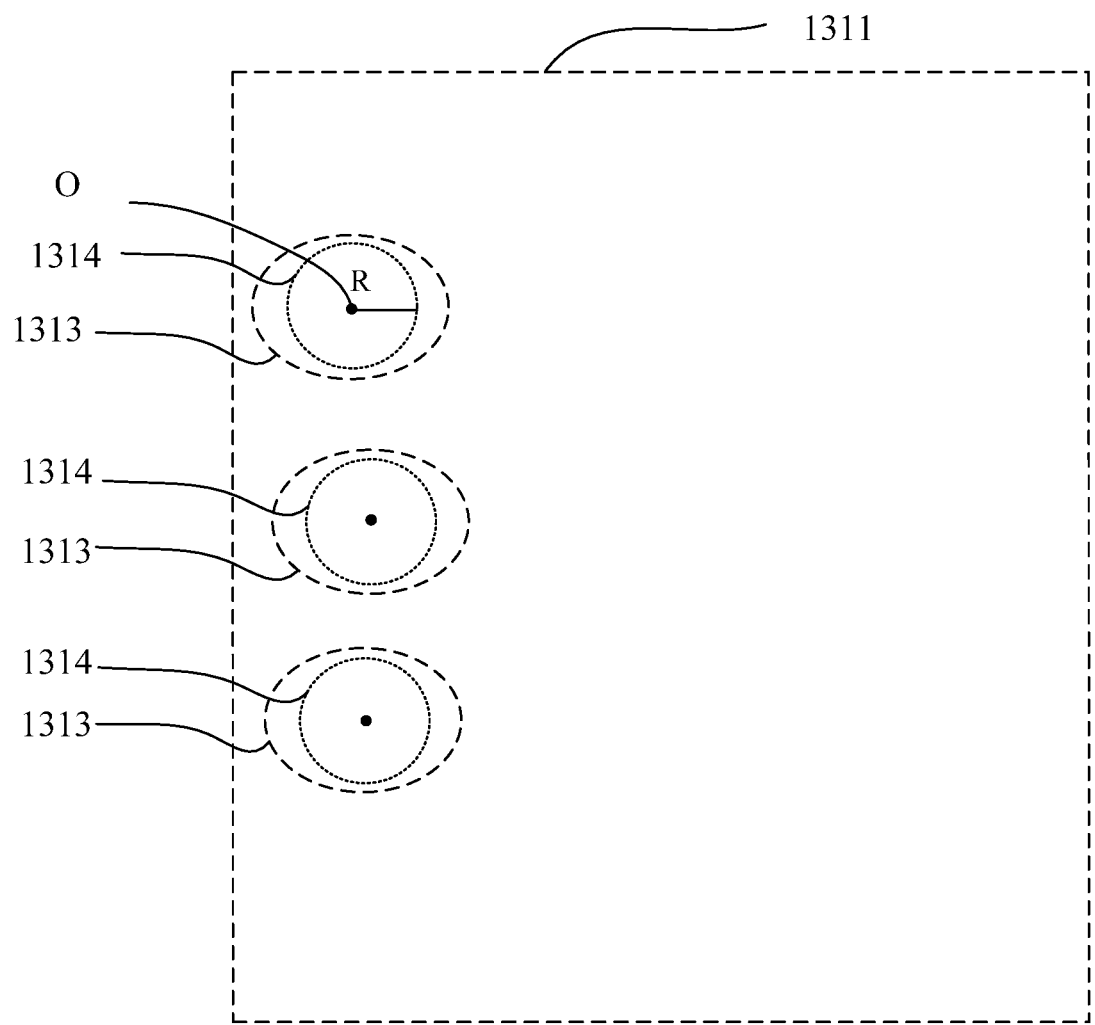
FIG. 34 is a schematic diagram of target fingerprint areas and target touch areas according to other implementations.

FIG. 34 is a schematic diagram of target fingerprint areas and target touch areas according to other implementations. In an implementation, determine (15023) fingerprint data in each target touch area according to the touch reference point to obtain the fingerprint image in each target touch area 1313 as follows. For each target touch area, a circular area with the touch reference point O as a center of a circle and a preset distance threshold R as a radius is determined to be the target fingerprint area 1314, where the target fingerprint area 1314 is within the target touch area 1313. Fingerprint data in each target fingerprint area 1314 is acquired to obtain the fingerprint image in each target touch area. In this implementation, the target fingerprint area 1314 is the circular area with the touch reference point as the center of the circle and the preset distance threshold as the radius. The target fingerprint area 1314 is more similar to the pressing portion of the finger of the user pressing the touch screen 130 in terms of shape. The preset distance threshold may be in the range of 4 mm~6 mm.

Figure 35:
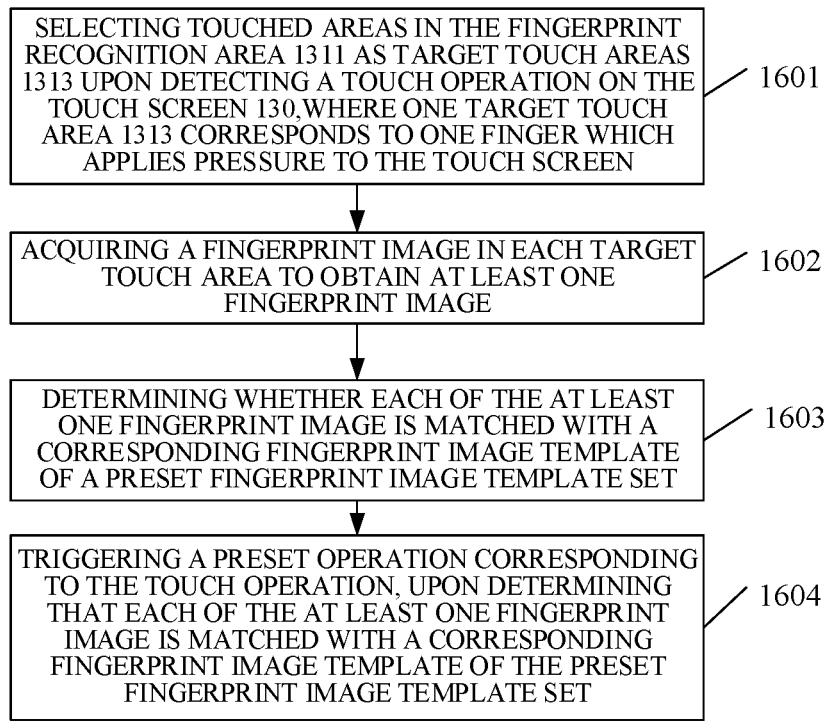
FIG. 35 is a schematic flow chart of a method for fingerprint recognition according to a fifth implementation.

FIG. 35 is a schematic flow chart of a method for fingerprint recognition according to a fifth implementation. The method is applicable to the above electronic device 100.

The electronic device 100 includes a touch screen 130 and a fingerprint sensor 150. The touch screen 130 has a fingerprint recognition area 1311. The fingerprint sensor 150 is disposed in an area corresponding to the fingerprint recognition area 1311. The fingerprint recognition area 1311 can be pressed by at least two fingers at the same time. The method includes 1601, 1602, 1603, and 1604, which are described in detail below.

At 1601, touched areas in the fingerprint recognition area 1311 are selected as target touch areas 1313 upon detecting a touch operation on the touch screen 130. One target touch area 1313 corresponds to one finger which applies pressure to the touch screen. For details of 1601, reference can be made to 1201 and the disclosure is not repeated herein.

At 1602, a fingerprint image in each target touch area is acquired to obtain at least one fingerprint image. For details of 1602, reference can be made to 1202, and the disclosure is not repeated herein.

At 1603, determine whether each of the at least one fingerprint image is matched with a corresponding fingerprint image template of a preset fingerprint image template set. For details of 1603, reference can be made to 1203, and the disclosure is not repeated herein.

At 1604, a preset operation corresponding to the touch operation is triggered, upon determining that each of the at least one fingerprint image is matched with a corresponding fingerprint image template of the preset fingerprint image template set. For details of 1604, reference can be made to 1204, and the disclosure is not repeated herein.

Figure 36:
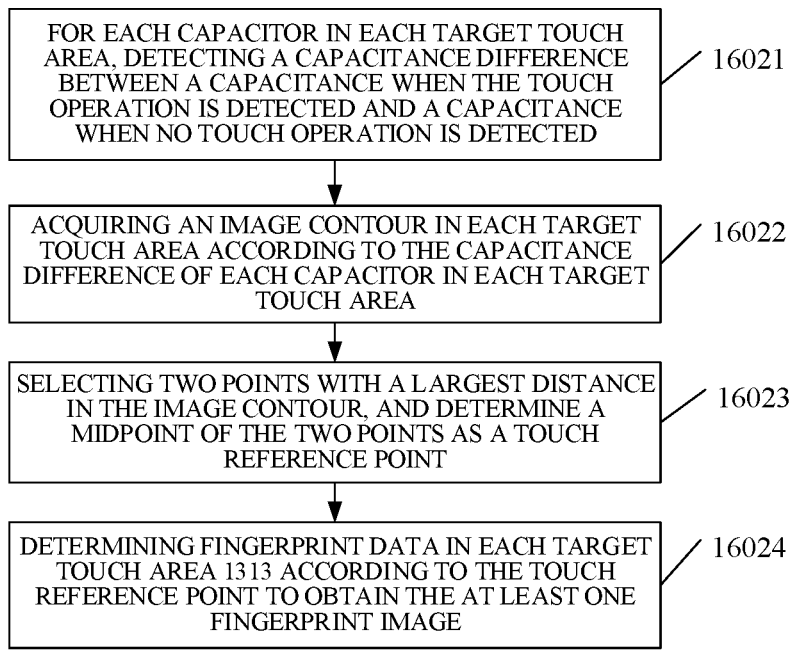
FIG. 36 is a flow chart illustrating the operation 1602 of FIG. 35.
Figure 37:
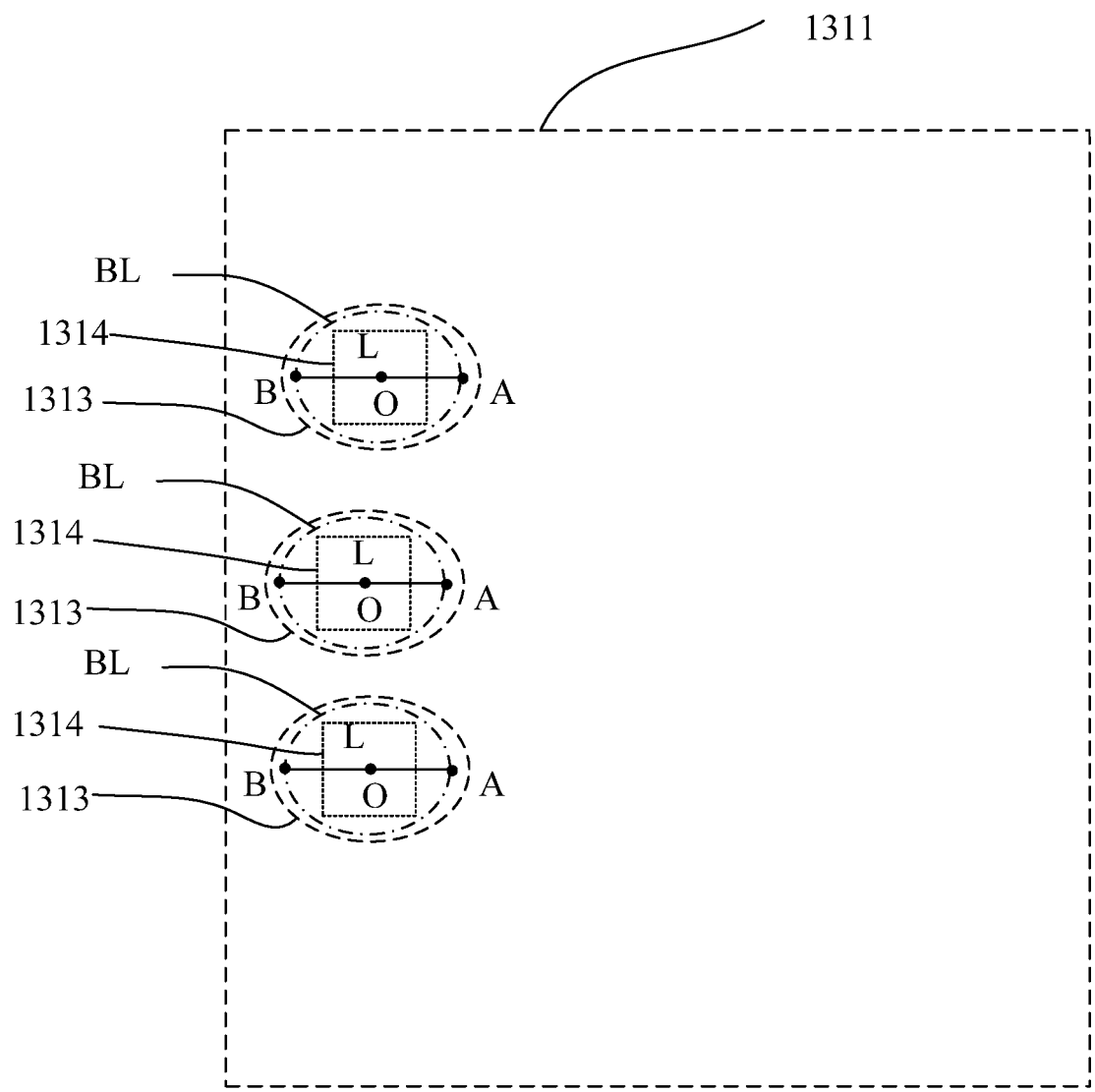
FIG. 37 is a schematic diagram of target fingerprint areas and target touch areas according to implementations.

The touch screen includes a capacitive touch screen, and the touch screen includes multiple capacitors arranged in array. FIG. 36 is a flow chart illustrating the operation 1602 of FIG. 35. FIG. 37 is a schematic diagram of target fingerprint areas and target touch areas according to implementations. In an implementation, 1602 (the fingerprint image in each target touch area is acquired to obtain the at least one fingerprint image) includes 16021, 16022, 16023, and 16024, which are detailed as follows.

At 16021, for each capacitor in each target touch area, detect a capacitance difference between a capacitance when the touch operation is detected and a capacitance when no touch operation is detected.

At 16022, an image contour in each target touch area is acquired according to the capacitance difference of each capacitor in each target touch area.

At 16023, select two points with a largest distance in the image contour, and determine a midpoint of the two points as a touch reference point.

At 16024, fingerprint data in each target touch area 1313 is determined according to the touch reference point to obtain the at least one fingerprint image.

In the case that the touch screen 130 is a capacitive touch screen, when the touch screen 130 is touched by the finger of the user, capacitances of the touch screen 130 change. The image contour can be obtained by detecting change of each capacitance in the touch screen 130, and the image contour is a boundary contour of a pressed portion of the touch screen 130 pressed by the finger of the user. For convenience of illustration, the boundary contour is labeled BL.

Generally, when the finger of the user is pressed onto the touch screen 130, the finger of the user is pressed obliquely onto the touch screen 130. Thus, when the electronic device is held by the user from a side (such as a left or right side) of the electronic device, the two points with the largest distance in the image contour are typically located on the X-axis of the touch screen 130. In this case, select (1623) the two points with the largest distance in the image contour as follows. Select a maximum point A and a minimum point B whose capacitances change and whose locations are on the X-axis in the fingerprint recognition area 1311, and determine the midpoint of the maximum point A and the minimum point B as the touch reference point O. It can be understood that, in other examples, the two points with the largest distance in the image contour are not necessarily located on the X-axis. The positions of the two points with the largest distance in the image contour are related to the postures of the user to touch the touch screen of the electronic device.

In an implementation, determine (16024) fingerprint data in each target touch area 1313 according to the touch reference point to obtain the at least one fingerprint image as follows. A preset distance threshold L is acquired. For each target touch area, a rectangular area with the touch reference point as a center O and the preset distance threshold L as an edge length is determined to be the target fingerprint area 1314, where the target fingerprint area 1314 is within the target touch area 1313. Fingerprint data in each target fingerprint area 1314 is acquired to obtain the at least one fingerprint image.

Figure 38:
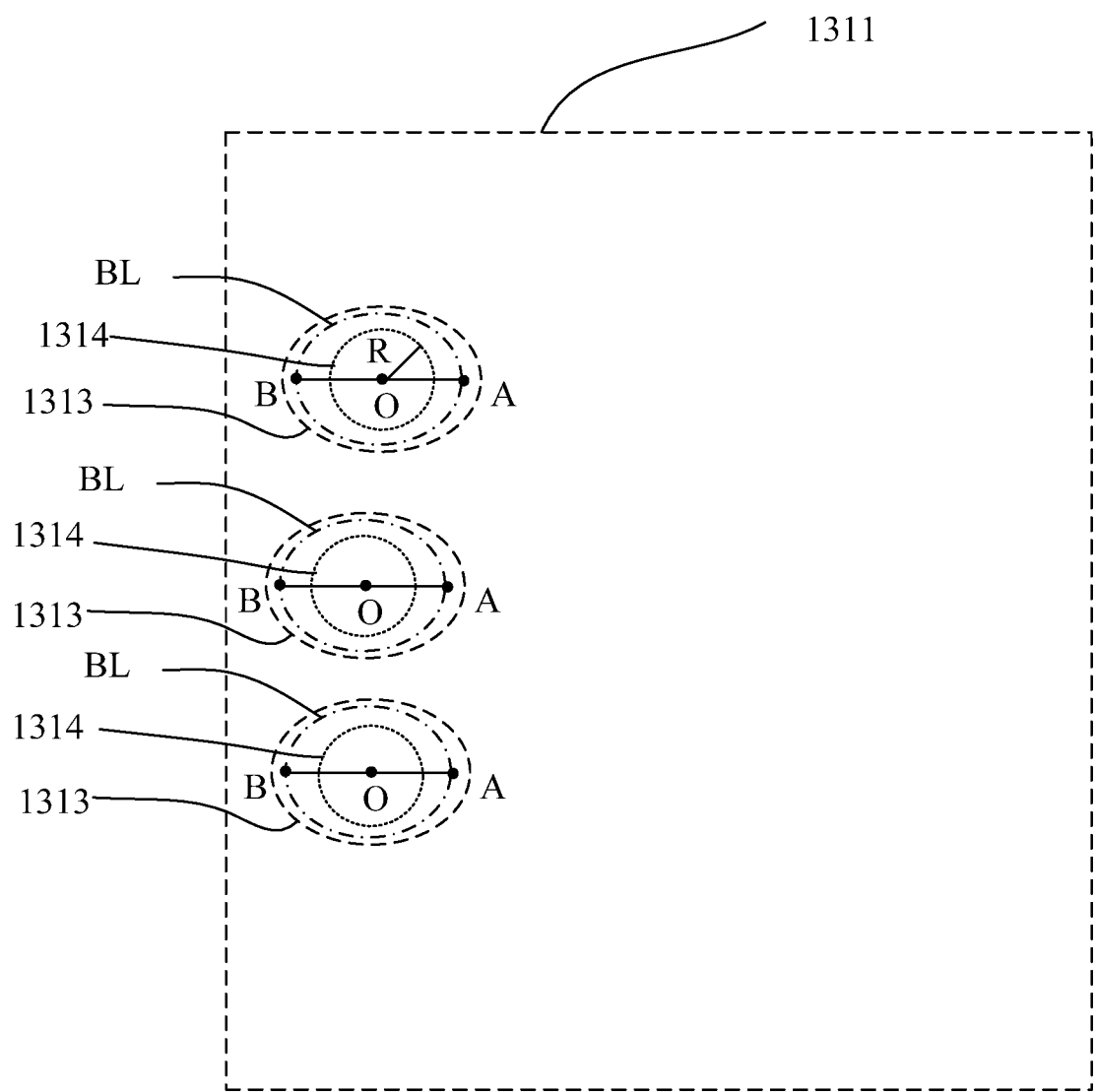
FIG. 38 is a schematic diagram of target fingerprint areas and target touch areas according to other implementations.

FIG. 38 is a schematic diagram of target fingerprint areas and target touch areas according to other implementations. In an implementation, determine (16024) fingerprint data in each target touch area 1313 according to the touch reference point to obtain the at least one fingerprint image as follows. A preset distance threshold R is acquired. For each target touch area, a circular area with the touch reference point O as a center of a circle and the preset distance threshold R as a radius is determined to be the target fingerprint area 1314, where the target fingerprint area 1314 is within the target touch area 1313. Fingerprint data in each target fingerprint area 1314 is acquired to obtain the at least one fingerprint image.

Figure 39:
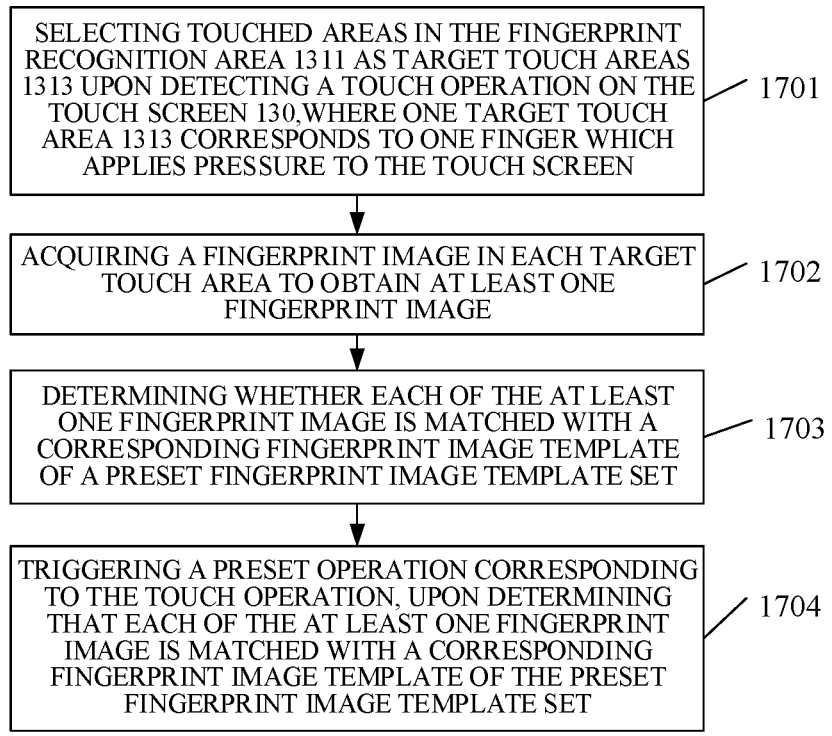
FIG. 39 is a schematic flow chart of a method for fingerprint recognition according to a sixth implementation.

FIG. 39 is a schematic flow chart of a method for fingerprint recognition according to a sixth implementation. The method is applicable to the above electronic device 100. The electronic device 100 includes a touch screen 130 and a fingerprint sensor 150. The touch screen 130 has a fingerprint recognition area 1311. The fingerprint sensor 150 is disposed in an area corresponding to the fingerprint recognition area 1311. The fingerprint recognition area 1311 can be pressed by at least two fingers at the same time. The method includes 1701, 1702, 1703, and 1704, which are described in detail below.

At 1701, touched areas in the fingerprint recognition area 1311 are selected as target touch areas 1313 upon detecting a touch operation on the touch screen 130. One target touch area 1313 corresponds to one finger which applies pressure to the touch screen. For details of 1701, reference can be made to 1201 and the disclosure is not repeated herein.

At 1702, a fingerprint image in each target touch area is acquired to obtain at least one fingerprint image. For details of 1702, reference can be made to 1202, and the disclosure is not repeated herein.

At 1703, determine whether each of the at least one fingerprint image is matched with a corresponding fingerprint image template of a preset fingerprint image template set. For details of 1703, reference can be made to 1203, and the disclosure is not repeated herein.

At 1704, a preset operation corresponding to the touch operation is triggered, upon determining that each of the at least one fingerprint image is matched with a corresponding fingerprint image template of the preset fingerprint image template set. For details of 1704, reference can be made to 1204, and the disclosure is not repeated herein.

Figure 40:
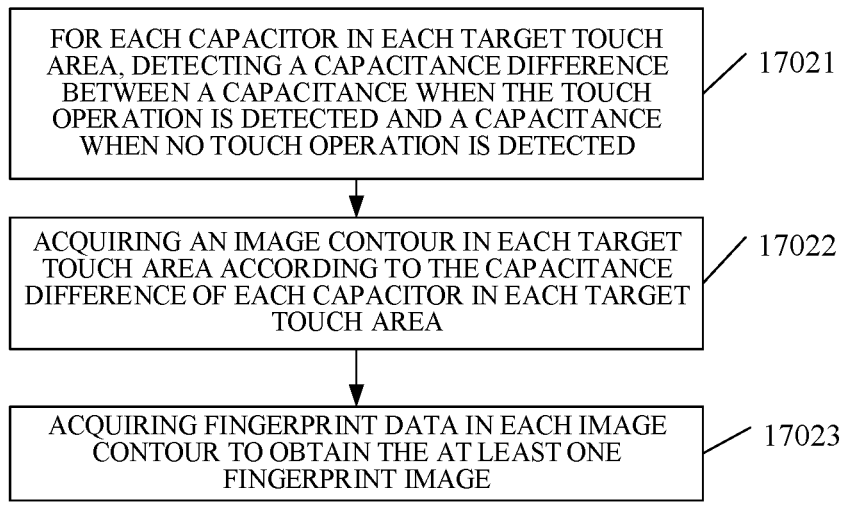
FIG. 40 is a schematic flow chart illustrating the operation 1702 of FIG. 39.

The touch screen 130 includes a capacitive touch screen, and the touch screen includes multiple capacitors arranged in array. FIG. 40 is a schematic flow chart illustrating the operation 1702 of FIG. 39. In an implementation, 1702 (the fingerprint image in each target touch area is acquired to obtain the at least one fingerprint image) includes 17021, 17022, and 17023, which are detailed as follows.

At 17021, for each capacitor in each target touch area, detect a capacitance difference between a capacitance when the touch operation is detected and a capacitance when no touch operation is detected.

At 17022, an image contour in each target touch area is acquired according to the capacitance difference of each capacitor in each target touch area.

At 17023, fingerprint data in each image contour is acquired to obtain the at least one fingerprint image.

Figure 41:
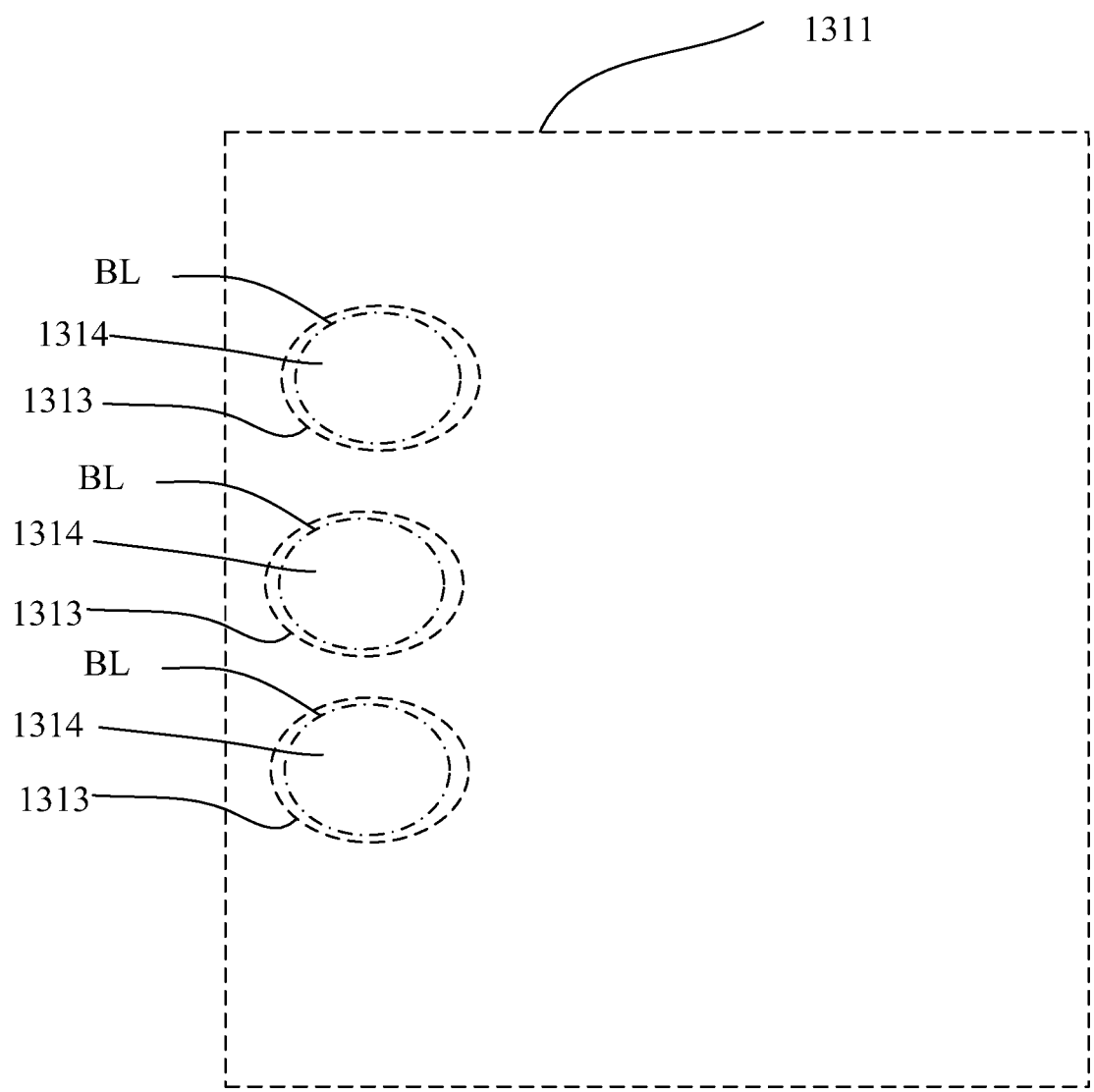
FIG. 41 is a schematic diagram of target fingerprint areas and target touch areas according to other implementations.

In the case that the touch screen 130 is a capacitive touch screen, when the touch screen 130 is touched by the finger of the user, capacitances of the touch screen 130 change. The image contour can be obtained by detecting change of each capacitance in the touch screen 130, and the image contour is a boundary contour of a pressed portion of the touch screen 130 pressed by the finger of the user. According to the application, the fingerprint image is obtained based on data in the image contour, thereby accurately extracting the fingerprint image. In this case, the boundary of the target fingerprint area 1314 is coincide with the boundary contour BL. FIG. 41 is a schematic diagram of target fingerprint areas and target touch areas according to other implementations.

Figure 42:
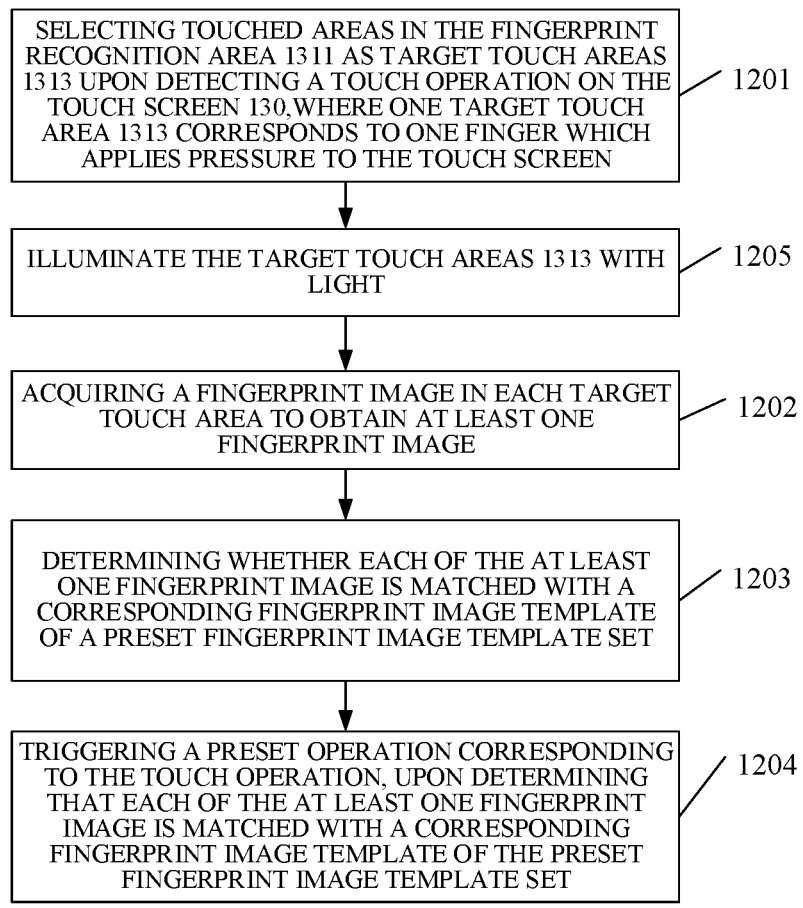
FIG. 42 is a schematic flow chart of a method for fingerprint recognition according to a seventh implementation.

In combination with any of the previous methods for fingerprint recognition, after selecting the touched areas in the fingerprint recognition area 1311 as the target touch areas 1313 upon detecting the touch operation on the touch screen 130 and acquiring the fingerprint image in each target touch area 1313 to obtain the at least one fingerprint image, illuminate (1205) the target touch areas 1313 with light. FIG. 42 is a schematic flow chart of a method for fingerprint recognition according to a seventh implementation. In this implementation, 1205 (illuminate the target touch areas 1313 with light) is in combination with the method for fingerprint recognition of the first implementation for illustration.

When the fingerprint recognition sensor 150 is an optical fingerprint sensor, light emitting units 110 corresponding to areas where the touch operation is performed emit light to illuminate the areas where the touch operation is performed, that is, illuminate the target touch areas 1313, to improve the definition of the fingerprint image collected by the fingerprint sensor 150. In an example, light emitting units 110 corresponding to an area outside the target touch areas 1313 of the touch screen 130 do not emit light, to save power. In another example, the light emitting units 110 corresponding to the target touch areas 1313 emit light to illuminate the target touch areas 1313, the remaining light emitting units 110 also emit light, and the light intensity of the light emitting units 110 corresponding to the target touch areas 1313 is greater than the light intensity of the remaining light emitting units 110.

Figure 43:
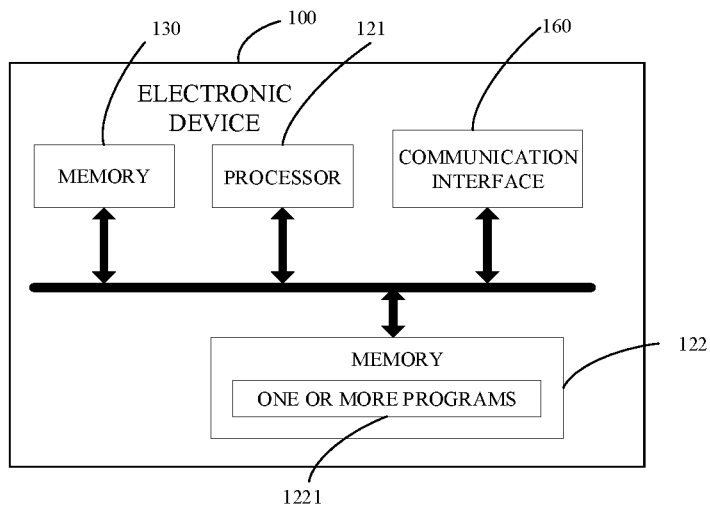
FIG. 43 is a schematic structural diagram of an electronic device according to implementations.

The present application further provides an electronic device 100. The electronic device 100 is described in detail below in conjunction with the electronic device and the method for fingerprint recognition described above. FIG. 43 is a schematic structural diagram of an electronic device according to implementations. The electronic device 100 runs with one or more applications and an operating system. The electronic device 100 includes a touch screen 130, a processor 121, a memory 122, a communication interface 160, and one or more programs 1221. The touch screen 130 has a fingerprint recognition area 1311. The fingerprint recognition area 1311 can be simultaneously pressed by at least two fingers. The one or more programs 1221 are stored in the memory 122 and configured to be executed by the processor 121. The one or more programs 1221 include instructions for performing the method for fingerprint recognition described in any of the preceding implementations. For details, reference is made to the detailed description of the method for fingerprint recognition described above.

The foregoing technical solutions of implementations of the disclosure are mainly described from a perspective of execution of the method. It can be understood that, in order to implement the above functions, the electronic device includes hardware structures and/or software modules for performing respective functions. Those of ordinary skill in the art will appreciate that units and algorithmic operations of various examples described in connection with implementations herein can be implemented in hardware or a combination of computer software and hardware. Whether these functions are implemented by means of hardware or computer software driving hardware depends on the particular application and the design constraints of the associated technical solution. For a specific application, those skilled in the art may use different methods to implement the described functionality, but such implementation should not be regarded as beyond the scope of the disclosure.

In implementations of the present disclosure, the electronic device can be divided into different functional units according to the above method implementations. For example, the electronic device can be divided into different functional units corresponding to each function, or two or more functions may be integrated into one processing unit. The integrated unit can take the form of hardware or a software functional unit. It is to be noted that, division of units provided herein is illustrative and is just a logical function division. In practice, there can be other manners of division.

Figure 44:
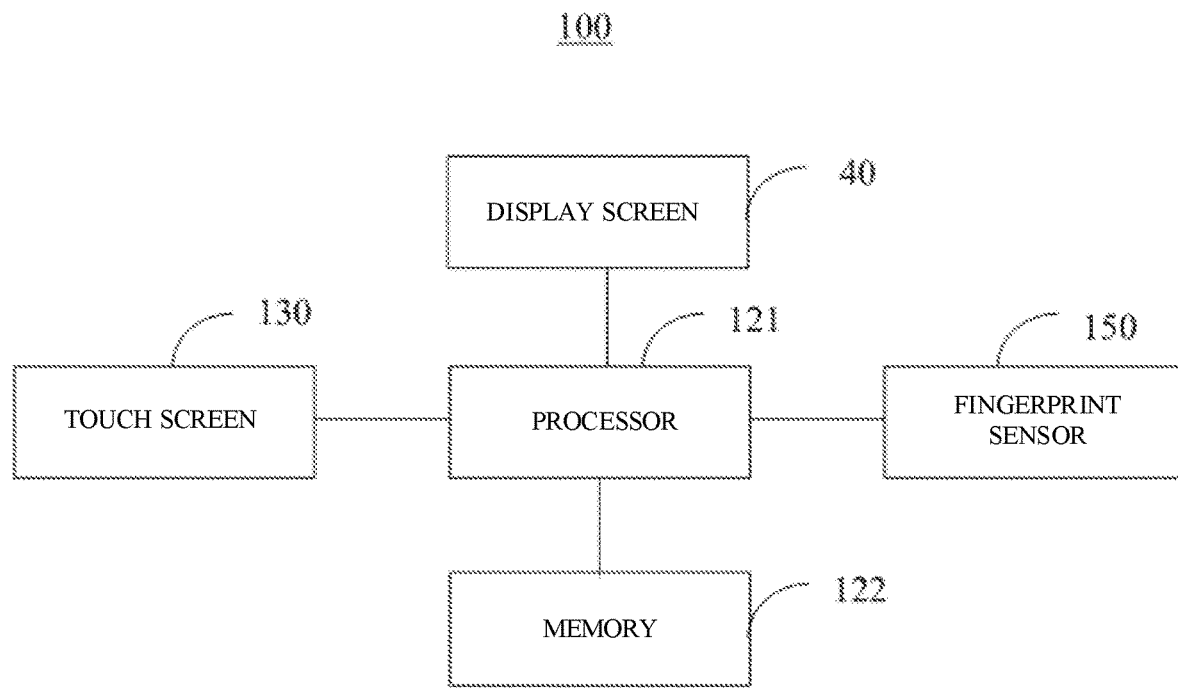
FIG. 44 is a frame diagram of an electronic device.

The present application further provides an electronic device 100. The electronic device 100 is described in detail below in conjunction with the electronic device and the method for fingerprint recognition described above. FIG. 44 is a frame schematic diagram of an electronic device. An electronic device is provided. The electronic device 100 includes a touch screen 130, a fingerprint sensor 150, a memory 122, and a processor 121.

The touch screen 130 has a fingerprint recognition area 1311 capable of being pressed by at least two fingers at the same time. The fingerprint sensor 150 is disposed in an area corresponding to the fingerprint recognition area 1311 and configured to acquire a fingerprint image. The memory 122 is configured to store a preset fingerprint image template set. The preset fingerprint image template set includes at least one fingerprint image template. The processor 121 is configured to: select touched areas in the fingerprint recognition area 1311 as target touch areas upon detecting a touch operation on the touch screen 130, where one target touch area corresponds to one finger which applies pressure to the touch screen, acquire a fingerprint image in each target touch area to obtain at least one fingerprint image, and trigger a preset operation corresponding to the touch operation, upon determining that each of the at least one fingerprint image is matched with a corresponding fingerprint image template of the preset fingerprint image template set.

In an implementation, the processor 121 configured to acquire the fingerprint image in each target touch area is configured to: for each target touch area, select a first preset number of target touch points in the target touch area, determine a touch reference point in the target touch area according to the target touch points, and determine fingerprint data in the target touch area according to the touch reference point and acquire the fingerprint image in the target touch area according to the fingerprint data.

In an implementation, the processor 121 configured to select the first preset number of target touch points in the target touch area is configured to: for each of a second preset number of touch points in each target touch area, determine a pressing intensity, and select, in according to a magnitude of the pressing intensity, a first preset number of touch points to be the target touch points, where the first preset number is less than the second preset number.

In an implementation, the touch reference point is a point that has a same distance to each of the first preset number of target touch points, or the touch screen includes a capacitive touch screen and the touch reference point is a point that has a same capacitance difference with each of the first preset number of target touch points.

In an implementation, the touch screen includes a capacitive touch screen, the touch screen includes multiple capacitors arranged in array, and the processor 121 configured to acquire the fingerprint image in each target touch area is configured to: for each target touch area, for each capacitor in each target touch area, detect a capacitance difference between a capacitance when the touch operation is detected and a capacitance when no touch operation is detected, set a touch point with a largest capacitance difference in the target touch area as a touch reference point, and determine fingerprint data in the target touch area according to the touch reference point and acquire the fingerprint image in the target touch area according to the fingerprint data.

In an implementation, the touch screen includes a capacitive touch screen, the touch screen includes multiple capacitors arranged in array, and the processor 121 configured to acquire the fingerprint image in each target touch area is configured to: for each target touch area, for each capacitor in each target touch area, detect a capacitance difference between a capacitance when the touch operation is detected and a capacitance when no touch operation is detected, acquire an image contour according to the capacitance difference of each capacitor in each target touch area, select two points with a largest distance in the image contour, and determine a midpoint of the two points as a touch reference point, and determine fingerprint data in the target touch area according to the touch reference point and acquire the fingerprint image in the target touch area according to the fingerprint data.

In an implementation, the processor 121 configured to determine the fingerprint data in the target touch area according to the touch reference point and acquire the fingerprint image in the target touch area according to the fingerprint data is configured to: acquire a preset distance threshold, for each target touch area, determine a circular area with the touch reference point as a center of a circle and the preset distance threshold as a radius to be a target fingerprint area, where the target fingerprint area is within the target touch area, and acquire the fingerprint image in the target touch area by acquiring fingerprint data in the target fingerprint area.

In an implementation, the processor 121 configured to determine the fingerprint data in the target touch area according to the touch reference point and acquire the fingerprint image in the target touch area according to the fingerprint data is configured to: acquire a preset distance threshold, for each target touch area, determine a rectangular area with the touch reference point as a center and the preset distance threshold as an edge length to be a target fingerprint area, where the target fingerprint area is within the target touch area, and acquire the fingerprint image in the target touch area by acquiring fingerprint data in the target fingerprint area.

In an implementation, the touch screen includes a capacitive touch screen, the touch screen includes multiple capacitors arranged in array, and the processor 121 configured to acquire the fingerprint image in each target touch area to obtain the at least one fingerprint image: for each capacitor in each target touch area, detect a capacitance difference between a capacitance when the touch operation is detected and a capacitance when no touch operation is detected, acquire an image contour in each target touch area according to the capacitance difference of each capacitor in each target touch area, and acquire fingerprint data in each image contour to obtain the at least one fingerprint image.

In an implementation, the electronic device 100 further includes a display screen 40 and the processor 121 is further configured to: control the display screen to illuminate the target touch areas 1313 with light, after selecting the touched areas in the fingerprint recognition area as the target touch areas upon detecting the touch operation on the touch screen and before acquiring the fingerprint image in each target touch area to obtain the at least one fingerprint image.

In an implementation, the processor 121 is further configured to: determine the number of fingerprint images of the at least one fingerprint image, and determine to trigger the preset operation corresponding to the touch operation upon determining that the number of the at least one fingerprint image equals to a preset number corresponding to the preset operation, after determining that each of the at least one fingerprint image is matched with a corresponding fingerprint image template of the preset fingerprint image template set.

Figure 45:
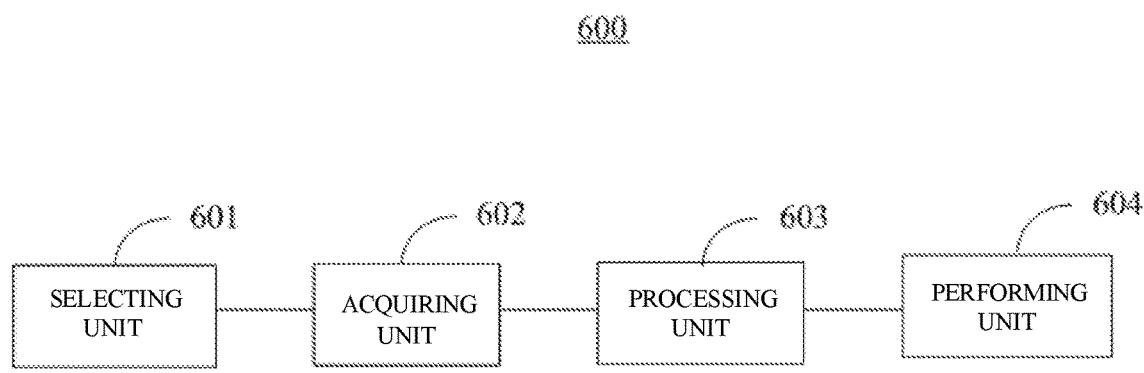
FIG. 45 is a block diagram of a device for fingerprint recognition according to implementations.

Furthermore, a device 600 for fingerprint recognition of this application is introduced in conjunction with the electronic device 100 and the method for fingerprint recognition described above. This application also provides the device 600 for fingerprint recognition. FIG. 45 is a block diagram of a device for fingerprint recognition according to implementations. The device 600 for fingerprint recognition is applicable to the electronic device 100 having a touch screen 130. The touch screen has a fingerprint recognition area which can hold at least two fingers at the same time. The device 600 for fingerprint recognition includes a selecting unit 601, an acquiring unit 602, a processing unit 603, and a performing unit 604.

The selecting unit 601 is configured to select touched areas in the fingerprint recognition area as target touch areas upon detecting a touch operation on the touch screen, where one target touch area corresponds to one finger which applies pressure to the touch screen.

The acquiring unit 602 is configured to acquire a fingerprint image in each target touch area to obtain at least one fingerprint image. For details of the selecting unit 601 and the acquiring unit 602, reference can be made to 1201 and 1202 and the disclosure is not repeated herein.

The processing unit 603 is configured to determine whether each of the at least one fingerprint image is matched with a corresponding fingerprint image template of a preset fingerprint image template set. For details, reference can be made to 1203 and the disclosure is not repeated herein.

The performing unit 604 is configured to perform a preset operation corresponding to the touch operation, upon determining that each of the at least one fingerprint image is matched with a corresponding fingerprint image template of the preset fingerprint image template set. For details, reference can be made to 1204 and the disclosure is not repeated herein.

According to this implementation, when the touch operation on the touch screen 130 is detected, the touched areas in the fingerprint recognition area 1311 are selected as the target touch areas 1313. Thereafter, data in the target touch areas 1313 rather than data in the entire fingerprint recognition area 1311 is acquired. Therefore, the amount of data processed in the subsequent acquisition of the fingerprint image can be reduced, which is advantageous for improving the speed of the fingerprint recognition.

In an implementation, the touch screen includes a capacitive touch screen, the touch screen includes multiple capacitors arranged in array, and the acquiring unit 602 configured to acquire the fingerprint image in each target touch area is configured to: for each target touch area, for each capacitor in each target touch area, detect a capacitance difference between a capacitance when the touch operation is detected and a capacitance when no touch operation is detected, set a touch point with a largest capacitance difference in each target touch area as a touch reference point, and determine fingerprint data in the target touch area according to the touch reference point and acquire the fingerprint image in the target touch area according to the fingerprint data.

In an implementation, the touch screen includes a capacitive touch screen, the touch screen includes multiple capacitors arranged in array, and the acquiring unit 602 configured to acquire the fingerprint image in each target touch area is configured to: for each capacitor in the target touch area, detect a capacitance difference between a capacitance when the touch operation is detected and a capacitance when no touch operation is detected, acquire an image contour in each target touch area according to the capacitance difference of each capacitor in the target touch area, select two points with a largest distance in the image contour, and determine a midpoint of the two points as a touch reference point, and determine fingerprint data in the target touch area according to the touch reference point and acquire the fingerprint image in the target touch area according to the fingerprint data.

In an implementation, the acquiring unit 602 configured to determine the fingerprint data in the target touch area according to the touch reference point and acquire the fingerprint image in the target touch area according to the fingerprint data is configured to: acquire a preset distance threshold, for each target touch area, determine a circular area with the touch reference point as a center of a circle and the preset distance threshold as a radius to be a target fingerprint area, where the target fingerprint area is within the target touch area, and acquire the fingerprint image in the target touch area by acquiring fingerprint data in the target fingerprint area.

In an implementation, the acquiring unit 602 configured to determine the fingerprint data in the target touch area according to the touch reference point and acquire the fingerprint image in the target touch area according to the fingerprint data is configured to: acquire a preset distance threshold, for each target touch area, determine a rectangular area with the touch reference point as a center and the preset distance threshold as an edge length to be a target fingerprint area, where the target fingerprint area is within the target touch area, and acquire the fingerprint image in the target touch area by acquiring fingerprint data in the target fingerprint area.

In an implementation, the touch screen includes a capacitive touch screen, the touch screen includes multiple capacitors arranged in array, and the acquiring unit 602 configured to acquire the fingerprint image in each target touch area to obtain the at least one fingerprint image: for each capacitor in each target touch area, detect a capacitance difference between a capacitance with the touch operation applied to the touch screen and a capacitance without the touch operation applied to the touch screen, acquire an image contour in each target touch area according to the capacitance difference of each capacitor in each target touch area, and acquire fingerprint data in each image contour to obtain the at least one fingerprint image.

In an implementation, the device 600 for fingerprint recognition is applicable to the electronic device 100. The electronic device 100 further includes a display screen 40 and the processing unit 603 is further configured to: control the display screen to illuminate the target touch areas 1313 with light, after selecting the touched areas in the fingerprint recognition area as the target touch areas upon detecting the touch operation on the touch screen and before acquiring the fingerprint image in each target touch area to obtain the at least one fingerprint image.

In an implementation, the acquiring unit 602 is further configured to: determine the number of fingerprint images of the at least one fingerprint image, and determine to trigger the preset operation corresponding to the touch operation upon determining that the number of the at least one fingerprint image equals to a preset number corresponding to the preset operation, after determining that each of the at least one fingerprint image is matched with a corresponding fingerprint image template of the preset fingerprint image template set.

The processing unit 603 and the performing unit 604 may be a controller or a processor. The acquiring unit 602 may be the touch screen 130 and the fingerprint sensor 150 corresponding to the touch screen 130.

Implementations of the present disclosure further provides a non-transitory computer readable storage medium. The non-transitory computer readable storage medium may store computer programs for electronic data interchange, and the computer programs are operable with a computer to execute all or part of operations of any of the fingerprint collection methods recited in the method implementations mentioned above. The computer includes a mobile terminal.

Implementations of the present disclosure further provide a computer program product. The computer program product includes a non-transitory computer readable storage medium that stores computer programs. The computer programs are operable with a computer to perform all or part of operations of any of the fingerprint collection methods recited in the method implementations mentioned above. The computer program product may be a software installation package. The computer includes a mobile terminal.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure.

It will be understood by those of ordinary skill in the art that all or part of the operations of the various methods of the implementations described above may be accomplished by means of a program to instruct associated hardware, the program may be stored in a computer-readable memory. For the memory, reference is made to the foregoing description, and no further description is provided here.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for fingerprint recognition, applicable to an electronic device comprising a touch screen, the touch screen having a fingerprint recognition area, and the fingerprint recognition area being capable of being pressed by at least two fingers, the method comprising:
   selecting touched areas in the fingerprint recognition area as target touch areas upon detecting a touch operation on the touch screen, wherein one target touch area corresponds to one finger which applies pressure to the touch screen;

for each target touch area,
- determining a pressing intensity for each of a second preset number of touch points in the target touch area;
- selecting according to a magnitude of the pressing intensity, a first preset number of touch points to be target touch points in the target touch area, to obtain a first preset number of target touch points, wherein the first preset number is less than the second preset number;
- determining a touch reference point in the target touch area according to the target touch points; and
- determining fingerprint data in the target touch area according to the touch reference point and acquiring a fingerprint image in the target touch area according to the fingerprint data;

obtaining at least one fingerprint image according to the fingerprint image in each target touch area;

determining whether each of the at least one fingerprint image is matched with a corresponding fingerprint image template of a preset fingerprint image template set; and triggering a preset operation corresponding to the touch operation, upon determining that each of the at least one fingerprint image is matched with a corresponding fingerprint image template of the preset fingerprint image template set.

2. The method of claim 1, wherein the touch reference point is a point that is at a same distance from each of the first preset number of target touch points, or the touch screen comprises a capacitive touch screen and the touch reference point is a point that has a same capacitance difference between each of the first preset number of target touch points.

3. The method of claim 1, wherein the touch screen comprises a capacitive touch screen, the touch screen comprises a plurality of capacitors arranged in array, and the method further comprises:

for each target touch area,
- for each capacitor in the target touch area, detecting a capacitance difference between a capacitance when the touch operation is detected and a capacitance when no touch operation is detected;
- setting a touch point with a largest capacitance difference in the target touch area as a touch reference point; and
- determining fingerprint data in the target touch area according to the touch reference point and acquiring the fingerprint image in the target touch area according to the fingerprint data.

4. The method of claim 1, wherein the touch screen comprises a capacitive touch screen, the touch screen comprises a plurality of capacitors arranged in array, and the method further comprises:

for each target touch area,
- for each capacitor in the target touch area, detecting a capacitance difference between a capacitance when the touch operation is detected and a capacitance when no touch operation is detected;
- acquiring an image contour according to the capacitance difference of each capacitor in the target touch area;
- selecting two points with a largest distance in the image contour, and determining a midpoint of the two points as a touch reference point; and
- determining fingerprint data in the target touch area according to the touch reference point and acquiring the fingerprint image in the target touch area according to the fingerprint data.

5. The method of claim 1, wherein determining the fingerprint data in the target touch area according to the touch reference point and acquiring the fingerprint image in the target touch area according to the fingerprint data comprises:

acquiring a preset distance threshold;

for each target touch area,
- determining a circular area with the touch reference point as a center of a circle and the preset distance threshold as a radius to be a target fingerprint area, wherein the target fingerprint area is within the target touch area; and
- acquiring the fingerprint image in the target touch area by acquiring fingerprint data in the target fingerprint area.

6. The method of claim 1, wherein determining the fingerprint data in the target touch area according to the touch reference point and acquiring the fingerprint image in the target touch area according to the fingerprint data comprises:

acquiring a preset distance threshold;

for each target touch area,
- determining a rectangular area with the touch reference point as a center and the preset distance threshold as an edge length to be a target fingerprint area, wherein the target fingerprint area is within the target touch area; and
- acquiring the fingerprint image in the target touch area by acquiring fingerprint data in the target fingerprint area.

7. The method of claim 1, wherein the touch screen comprises a capacitive touch screen, the touch screen comprises a plurality of capacitors arranged in array, and the method further comprises:

for each capacitor in each target touch area, detecting a capacitance difference between a capacitance when the touch operation is detected and a capacitance when no touch operation is detected;

acquiring an image contour in each target touch area according to the capacitance difference of each capacitor in each target touch area; and acquiring fingerprint data in each image contour to obtain the at least one fingerprint image.

8. The method of claim 1, further comprising:

after selecting the touched areas in the fingerprint recognition area as the target touch areas upon detecting the touch operation on the touch screen, illuminating the target touch areas with light.

9. The method of claim 1, further comprising:

after determining that each of the at least one fingerprint image is matched with a corresponding fingerprint image template of the preset fingerprint image template set, determining the number of fingerprint images of the at least one fingerprint image; and determining to trigger the preset operation corresponding to the touch operation, upon determining that the number of the at least one fingerprint image equals to a preset number corresponding to the preset operation.

10. An electronic device, comprising:

a touch screen having a fingerprint recognition area capable of being pressed by at least two fingers;

a fingerprint sensor disposed in an area corresponding to the fingerprint recognition area and configured to acquire a fingerprint image;
a memory configured to store a preset fingerprint image template set comprising at least one fingerprint image template; and
a processor configured to:
select touched areas in the fingerprint recognition area as target touch areas upon detecting a touch operation on the touch screen, wherein one target touch area corresponds to one finger which applies pressure to the touch screen;
for each target touch area,
determine a pressing intensity for each of a second preset number of touch points in the target touch area;
select according to a magnitude of the pressing intensity, a first preset number of touch points to be target touch points in the target touch area, to obtain a first preset number of target touch points, wherein the first preset number is less than the second preset number;
determine a touch reference point in the target touch area according to the target touch points; and
determine fingerprint data in the target touch area according to the touch reference point and acquire a fingerprint image in the target touch area according to the fingerprint data;
obtain at least one fingerprint image according to the fingerprint image in each target touch area; and
trigger a preset operation corresponding to the touch operation, upon determining that each of the at least one fingerprint image is matched with a corresponding fingerprint image template of the preset fingerprint image template set.

11. The electronic device of claim 10, wherein the touch reference point is a point that is at a same distance from each of the first preset number of target touch points, or the touch screen comprises a capacitive touch screen and the touch reference point is a point that has a same capacitance difference between each of the first preset number of target touch points.

12. The electronic device of claim 10, wherein the touch screen comprises a capacitive touch screen, the touch screen comprises a plurality of capacitors arranged in array, and the processor is further configured to:
for each target touch area,
for each capacitor in the target touch area, detect a capacitance difference between a capacitance when the touch operation is detected and a capacitance when no touch operation is detected;
set a touch point with a largest capacitance difference in the target touch area as a touch reference point; and
determine fingerprint data in the target touch area according to the touch reference point and acquire the fingerprint image in the target touch area according to the fingerprint data.

13. The electronic device of claim 10, wherein the touch screen comprises a capacitive touch screen, the touch screen comprises a plurality of capacitors arranged in array, and the processor is further configured to:
for each target touch area,
for each capacitor in the target touch area, detect a capacitance difference between a capacitance when the touch operation is detected and a capacitance when no touch operation is detected;
acquire an image contour according to the capacitance difference of each capacitor in the target touch area;
select two points with a largest distance in the image contour, and determine a midpoint of the two points as a touch reference point; and
determine fingerprint data in the target touch area according to the touch reference point and acquire the fingerprint image in the target touch area according to the fingerprint data.

14. The electronic device of claim 10, wherein the processor configured to determine the fingerprint data in the target touch area according to the touch reference point and acquire the fingerprint image in the target touch area according to the fingerprint data is configured to:
acquire a preset distance threshold;
for each target touch area,
determine a circular area with the touch reference point as a center of a circle and the preset distance threshold as a radius to be a target fingerprint area, wherein the target fingerprint area is within the target touch area; and
acquire the fingerprint image in the target touch area by acquiring fingerprint data in the target fingerprint area.

15. The electronic device of claim 10, wherein the processor configured to determine the fingerprint data in the target touch area according to the touch reference point and acquire the fingerprint image in the target touch area according to the fingerprint data is configured to:
acquire a preset distance threshold;
for each target touch area,
determine a rectangular area with the touch reference point as a center and the preset distance threshold as an edge length to be a target fingerprint area, wherein the target fingerprint area is within the target touch area; and
acquire the fingerprint image in the target touch area by acquiring fingerprint data in the target fingerprint area.

16. A non-transitory computer readable storage medium storing a computer program which, when executed by a processor, causes the processor to carry out actions, comprising:
selecting touched areas in a fingerprint recognition area as target touch areas upon detecting a touch operation on a touch screen, wherein one target touch area corresponds to one finger which applies pressure to the touch screen;
for each target touch area,
determining a pressing intensity for each of a second preset number of touch points in the target touch area;
selecting according to a magnitude of the pressing intensity, a first preset number of touch points to be target touch points in the target touch area, to obtain a first preset number of target touch points, wherein the first preset number is less than the second preset number;
determining a touch reference point in the target touch area according to the target touch points; and
determining fingerprint data in the target touch area according to the touch reference point and acquiring a fingerprint image in the target touch area according to the fingerprint data;
obtaining at least one fingerprint image according to the fingerprint image in each target touch area; and triggering a preset operation corresponding to the touch operation, upon determining that each of the at least one fingerprint image is matched with a corresponding fingerprint image template of a preset fingerprint image template set.

\* \* \* \* \*